United States Patent
Han et al.

(10) Patent No.: US 10,020,491 B2
(45) Date of Patent: Jul. 10, 2018

(54) SILICON-BASED ACTIVE MATERIALS FOR LITHIUM ION BATTERIES AND SYNTHESIS WITH SOLUTION PROCESSING

(71) Applicant: Envia Systems, Inc., Newark, CA (US)

(72) Inventors: Yongbong Han, San Francisco, CA (US); Charan Masarapu, Fremont, CA (US); Haixia Deng, Fremont, CA (US); Yogesh Kumar Anguchamy, Newark, CA (US); Subramanian Venkatachalam, Pleasanton, CA (US); Herman A. Lopez, Sunnyvale, CA (US)

(73) Assignee: Zenlabs Energy, Inc., Fremont, CA (US)

( * ) Notice: Subject to any disclaimer, the term of this patent is extended or adjusted under 35 U.S.C. 154(b) by 985 days.

(21) Appl. No.: 13/864,212

(22) Filed: Apr. 16, 2013

(65) Prior Publication Data
US 2014/0308585 A1    Oct. 16, 2014

(51) Int. Cl.
*H01M 4/13* (2010.01)
*H01M 4/36* (2006.01)
(Continued)

(52) U.S. Cl.
CPC .......... *H01M 4/362* (2013.01); *C01B 33/113* (2013.01); *C01B 33/18* (2013.01); *C04B 35/14* (2013.01);
(Continued)

(58) Field of Classification Search
CPC ...... H01M 4/362; H01M 4/366; H01M 4/587; H01M 4/386; H01M 4/483; H01M 4/625;
(Continued)

(56) References Cited

U.S. PATENT DOCUMENTS

| 4,086,404 A | 11/1978 | Vissers et al. |
| 5,395,711 A | 3/1995 | Tahara et al. |

(Continued)

FOREIGN PATENT DOCUMENTS

| EP | 2079120 A1 | 7/2009 |
| EP | 2141759 A1 | 1/2010 |

(Continued)

OTHER PUBLICATIONS

Hua-Chao Tao, "Interweaved Si@SiOx/C nanoporous spheres as anode materials for Li-ion batteries", Solid State Ionics 220, Publish 2012, p. 1-6.*

(Continued)

*Primary Examiner* — Jimmy Vo
(74) *Attorney, Agent, or Firm* — Christensen, Fonder, Dardi & Herbert PLLC; Peter S. Dardi

(57) ABSTRACT

Silicon based anode active materials are described for use in lithium ion batteries. The silicon based materials are generally composites of nanoscale elemental silicon with stabilizing components that can comprise, for example, silicon oxide-carbon matrix material, inert metal coatings or combinations thereof. High surface area morphology can further contribute to the material stability when cycled in a lithium based battery. In general, the material synthesis involves a significant solution based processing step that can be designed to yield desired material properties as well as providing convenient and scalable processing.

20 Claims, 10 Drawing Sheets

(51) Int. Cl.
- *C04B 35/14* (2006.01)
- *C04B 35/532* (2006.01)
- *C04B 35/571* (2006.01)
- *C04B 35/80* (2006.01)
- *H01M 4/38* (2006.01)
- *H01M 4/48* (2010.01)
- *H01M 4/62* (2006.01)
- *C01B 33/113* (2006.01)
- *C01B 33/18* (2006.01)

(52) U.S. Cl.
CPC .......... *C04B 35/532* (2013.01); *C04B 35/571* (2013.01); *C04B 35/806* (2013.01); *H01M 4/386* (2013.01); *H01M 4/483* (2013.01); *H01M 4/625* (2013.01); *C04B 2235/425* (2013.01); *C04B 2235/428* (2013.01); *C04B 2235/441* (2013.01); *C04B 2235/5288* (2013.01); *C04B 2235/5409* (2013.01); *C04B 2235/5445* (2013.01); *C04B 2235/80* (2013.01); *H01M 4/13* (2013.01)

(58) Field of Classification Search
CPC ........ H01M 4/13; C01B 33/113; C01B 33/18; C04B 35/14; C04B 35/532; C04B 35/571; C04B 35/806; C04B 2235/425; C04B 2235/428; C04B 2235/441; C04B 2235/5288; C04B 2235/5409; C04B 2235/5445; C04B 2235/80
See application file for complete search history.

(56) References Cited

U.S. PATENT DOCUMENTS

| | | | |
|---|---|---|---|
| 5,792,577 A | 8/1998 | Ejiri et al. | |
| 6,083,644 A | 7/2000 | Watanabe et al. | |
| 6,235,427 B1 | 5/2001 | Idota et al. | |
| 6,251,822 B1 | 6/2001 | Peng et al. | |
| 6,335,115 B1 | 1/2002 | Meissner | |
| 6,528,208 B1 | 3/2003 | Thackeray et al. | |
| 6,638,662 B2 | 10/2003 | Kaneda et al. | |
| 6,645,671 B2 | 11/2003 | Tsutsumi et al. | |
| 6,677,082 B2 | 1/2004 | Thackeray et al. | |
| 6,680,143 B2 | 1/2004 | Thackeray et al. | |
| 6,699,336 B2 | 3/2004 | Turner et al. | |
| 6,759,160 B2 | 7/2004 | Fukuoka et al. | |
| 6,893,621 B2 | 5/2005 | Fukuoka et al. | |
| 6,899,970 B1 | 5/2005 | Rogers et al. | |
| 6,979,513 B2 | 12/2005 | Kelley et al. | |
| 7,037,581 B2 | 5/2006 | Aramata et al. | |
| 7,195,842 B1 | 3/2007 | Fujimoto et al. | |
| 7,205,072 B2 | 4/2007 | Kang et al. | |
| 7,235,330 B1 | 6/2007 | Fujimoto et al. | |
| 7,252,907 B2 | 8/2007 | Takeuchi et al. | |
| 7,297,446 B2 | 11/2007 | Fukui et al. | |
| 7,432,015 B2 | 10/2008 | Jeong et al. | |
| 7,435,402 B2 | 10/2008 | Kang et al. | |
| 7,452,632 B2 | 11/2008 | Lee et al. | |
| 7,514,369 B2 | 4/2009 | Li et al. | |
| 7,517,614 B2 | 4/2009 | Jeong et al. | |
| 7,575,830 B2 | 8/2009 | Kawamura et al. | |
| 7,615,314 B2 | 11/2009 | Kawakami et al. | |
| 7,658,863 B2 | 2/2010 | Aramata et al. | |
| 7,754,389 B2 | 7/2010 | Yamaguchi et al. | |
| 7,776,473 B2 | 8/2010 | Aramata et al. | |
| 7,790,316 B2 | 9/2010 | Aramata et al. | |
| 7,833,662 B2 | 11/2010 | Kim et al. | |
| 7,851,085 B2 | 12/2010 | Obrovac et al. | |
| 7,871,727 B2 | 1/2011 | Obrovac et al. | |
| 8,389,160 B2 | 3/2013 | Venkatachalam et al. | |
| 8,394,534 B2 | 3/2013 | Lopez et al. | |
| 2001/0031396 A1 | 10/2001 | Tsutsumi et al. | |
| 2002/0164479 A1* | 11/2002 | Matsubara | H01M 4/362 428/367 |
| 2003/0157014 A1 | 8/2003 | Wang et al. | |
| 2003/0157407 A1 | 8/2003 | Kosuzu et al. | |
| 2003/0211390 A1 | 11/2003 | Dahn et al. | |
| 2003/0215711 A1* | 11/2003 | Aramata | B82Y 30/00 429/218.1 |
| 2004/0023117 A1 | 2/2004 | Imachi et al. | |
| 2004/0033419 A1 | 2/2004 | Funabiki | |
| 2004/0146734 A1 | 7/2004 | Miller et al. | |
| 2004/0151951 A1 | 8/2004 | Hyung et al. | |
| 2004/0191630 A1 | 9/2004 | Kawamura et al. | |
| 2004/0214085 A1 | 10/2004 | Sheem et al. | |
| 2004/0241548 A1 | 12/2004 | Nakamoto et al. | |
| 2005/0019670 A1 | 1/2005 | Amine et al. | |
| 2005/0031942 A1 | 2/2005 | Hennige et al. | |
| 2005/0175901 A1 | 8/2005 | Kawakami et al. | |
| 2005/0214644 A1 | 9/2005 | Aramata et al. | |
| 2005/0233213 A1 | 10/2005 | Lee et al. | |
| 2006/0003227 A1 | 1/2006 | Aramata et al. | |
| 2006/0040182 A1 | 3/2006 | Kawakami et al. | |
| 2006/0051673 A1 | 3/2006 | Johnson et al. | |
| 2006/0068285 A1 | 3/2006 | Yamaguchi et al. | |
| 2006/0115734 A1 | 6/2006 | Ishihara et al. | |
| 2007/0048612 A1 | 3/2007 | Nakajima et al. | |
| 2007/0059601 A1 | 3/2007 | Natsume et al. | |
| 2007/0072086 A1* | 3/2007 | Nakagawa | H01M 4/525 429/330 |
| 2007/0099436 A1 | 5/2007 | Kogetsu et al. | |
| 2007/0148544 A1 | 6/2007 | Le | |
| 2007/0190413 A1 | 8/2007 | Lee et al. | |
| 2007/0207381 A1 | 9/2007 | Ohtsuka et al. | |
| 2007/0254102 A1 | 11/2007 | Fukuoka et al. | |
| 2007/0259113 A1 | 11/2007 | Kizaki et al. | |
| 2008/0095930 A1 | 4/2008 | Natsume et al. | |
| 2008/0113269 A1 | 5/2008 | Yamamoto et al. | |
| 2008/0131772 A1 | 6/2008 | Jambunathan et al. | |
| 2008/0135801 A1 | 6/2008 | Kizaki et al. | |
| 2008/0160265 A1 | 7/2008 | Hieslmair et al. | |
| 2008/0193831 A1 | 8/2008 | Mah et al. | |
| 2008/0213671 A1 | 9/2008 | Kogetsu et al. | |
| 2008/0226988 A1 | 9/2008 | Minami et al. | |
| 2008/0268347 A1 | 10/2008 | Ohzuku et al. | |
| 2009/0004564 A1 | 1/2009 | Ishida et al. | |
| 2009/0029256 A1 | 1/2009 | Mah et al. | |
| 2009/0047577 A1 | 2/2009 | Iwamoto et al. | |
| 2009/0053608 A1 | 2/2009 | Choi et al. | |
| 2009/0092899 A1 | 4/2009 | Treger | |
| 2009/0117466 A1 | 5/2009 | Zhamu et al. | |
| 2009/0130562 A1 | 5/2009 | Mao et al. | |
| 2009/0169994 A1 | 7/2009 | Mah et al. | |
| 2009/0186267 A1 | 7/2009 | Tiegs | |
| 2009/0239151 A1 | 9/2009 | Nakanishi et al. | |
| 2009/0263707 A1 | 10/2009 | Buckley et al. | |
| 2009/0305131 A1 | 12/2009 | Kumar et al. | |
| 2009/0317721 A1 | 12/2009 | Shirane et al. | |
| 2009/0325061 A1 | 12/2009 | Lim | |
| 2010/0009261 A1 | 1/2010 | Watanabe | |
| 2010/0047671 A1 | 2/2010 | Chiang et al. | |
| 2010/0055563 A1 | 3/2010 | Nakanishi et al. | |
| 2010/0086853 A1 | 4/2010 | Venkatachalam et al. | |
| 2010/0086854 A1 | 4/2010 | Kumar et al. | |
| 2010/0119939 A1 | 5/2010 | Misumi et al. | |
| 2010/0119942 A1 | 5/2010 | Kumar | |
| 2010/0151332 A1 | 6/2010 | Lopez et al. | |
| 2010/0159366 A1 | 6/2010 | Shao-Horn et al. | |
| 2010/0178566 A1 | 7/2010 | Kogetsu et al. | |
| 2010/0233543 A1 | 9/2010 | Numata et al. | |
| 2010/0243951 A1 | 9/2010 | Watanabe et al. | |
| 2010/0288970 A1 | 11/2010 | Watanabe et al. | |
| 2011/0017528 A1 | 1/2011 | Kumar et al. | |
| 2011/0052981 A1 | 3/2011 | Lopez et al. | |
| 2011/0052989 A1 | 3/2011 | Venkatachalam et al. | |
| 2011/0076556 A1 | 3/2011 | Karthikeyan et al. | |
| 2011/0085960 A1 | 4/2011 | Mukasyan et al. | |
| 2011/0111294 A1 | 5/2011 | Lopez et al. | |
| 2011/0111298 A1 | 5/2011 | Lopez et al. | |
| 2011/0111303 A1 | 5/2011 | Kung et al. | |
| 2011/0136019 A1 | 6/2011 | Amiruddin et al. | |
| 2011/0163274 A1 | 7/2011 | Plee et al. | |
| 2011/0171529 A1 | 7/2011 | Kono et al. | |

(56) References Cited

U.S. PATENT DOCUMENTS

| | | |
|---|---|---|
| 2011/0244331 A1 | 10/2011 | Karthikeyan et al. |
| 2012/0028105 A1 | 2/2012 | Kumar et al. |
| 2012/0056590 A1 | 3/2012 | Amiruddin et al. |
| 2012/0070725 A1 | 3/2012 | Venkatachalam et al. |
| 2012/0105007 A1 | 5/2012 | Amirrudin et al. |
| 2012/0107680 A1 | 5/2012 | Amiruddin et al. |
| 2012/0121982 A1 | 5/2012 | Harimoto et al. |
| 2012/0264020 A1 | 10/2012 | Burton et al. |
| 2012/0295155 A1 | 11/2012 | Deng et al. |
| 2013/0078508 A1 | 3/2013 | Tolbert et al. |
| 2013/0157147 A1 | 6/2013 | Li et al. |
| 2013/0189575 A1 | 7/2013 | Anguchamy et al. |
| 2013/0295439 A1 | 11/2013 | Masarapu et al. |
| 2014/0065464 A1 | 3/2014 | Masarapu et al. |

FOREIGN PATENT DOCUMENTS

| | | |
|---|---|---|
| JP | 07065825 | 3/1995 |
| JP | 2001118568 | 4/2001 |
| JP | 2010055775 | 3/2010 |
| KR | 1020040096381 A | 11/2004 |
| KR | 1020040100058 A | 12/2004 |
| KR | 100493960 B1 | 6/2005 |
| KR | 1020060087003 A | 8/2006 |
| KR | 1020060087183 A | 8/2006 |
| WO | 0135473 A1 | 5/2001 |
| WO | 2004025757 A2 | 3/2004 |
| WO | 2005011030 A1 | 2/2005 |
| WO | 2005065082 A2 | 7/2005 |
| WO | 2005076389 A2 | 8/2005 |
| WO | 2006109930 A1 | 10/2006 |
| WO | 2007126257 A1 | 11/2007 |
| WO | 2011053736 A1 | 5/2011 |

OTHER PUBLICATIONS (2009) Achiha et al., "Electrochemical Behavior of Nonflammable Organo-Fluorine Compunds for Lithium Ion Batteries," Journal of the Electrochemical Society 156(6): A483-A488 (2009).
(2008) Chan et al., "High-performance lithium battery anodes using silicon nanowires," Nature Nanotechnology Jan. 2008, vol. 3, pp. 31-35.
(2003 MIT) Chen et al., "Electrochemical Insertion/extraction of Lithium in Multiwall Carbon Nanotube/Sb and SnSb0.5 Nanocomposites," published by the Massachusetts Institute of Technology, division of Molecular Engineering of Biological and Chemical Systems, Dec. 2003.
(2006) Choi et al., "Effect of fluoroethylene carbonate additive on interfacial properties of silicon thin-film electrode" Journal of Power Sources 161 (2006) 1254-1259. (Abstract only).
(2009) Cui et al., "Carbon-silicon core-shell nanowires as high capacity electrode for lithium ion batteries," Nano Lett. 9(9):3370-3374 (2009).
(2011) Guerfi et al., "SiOx-graphite as negative for high energy Li-ion batteries," Journal of Power Sources 196:5667-5673 (2011).
(2010) Ishikawa et al., "Li-ion Battery Performance with FSI-based Ionic Liquid Electrolyte and Fluorinated Solvent-based Electrolyte" ECS Trans. 33:29-36 (2010) (Abstract).
(2010) Jeong et al., "A Nanostructured SiAl0.2O Anode Material for Lithium Batteries," Chem. Mater. 22:5570-5579 (2010).
(2009) Kang et al., "Enhancing the rate capability of high capacity xLi2MnO3 • (1-x)LiMO2 (M=Mn, Ni, Co) electrodes by Li-Ni-PO4 treatment," Electrochemistry Communications 11:748-751 (2009).
(2005) Kang et al., Layered Li(Li0.2Ni0.15+0.5zCo0.10Mn0.55-0.5z)O2-zFz cathode materials for Li-ion secondary batteries, Journal of Power Sources 146:654-657 (2005).
(2006-SunYK_EA) Kim et al., Synthesis of spherical Li{ni(1/3-z)Co(1/3-z)Mn(1/3-z)Mgz]O2 as positive electrode material for lithium ion battery, Electrochimica Acta 51:2447-2453 (2006).

(2005-SunYK-ECS) Kim et al., Improvement of High-Voltage Cycling Behavior of Surface Modified Li [Ni1/3Co1/3Mn1/3]O2 Cathodes by Fluorine Substitution for Li-Ion Batteries, Journal of the Electrochemical Society 152 (9) A1707-A1713 (2005).
(2006-SunYK-JPS) Lee et al., "High capacity Li[Li0.2Ni0.2Mn0.6]O2 cathode materials via a carbonate co-precipitation method," J. of Power Sources, 162:1346-1350 (2006).
(2009) Liu et al., "Improvement of cycling stability of Si anode by mechanochemical reduction and carbon coatings." Journal of Power Sources, 189, pp. 480-484 (2009).
(2001) Liu et al., "Electrical transport in doped multiwalled carbon nanotubes," Physical Review B, vol. 63,161404 (R), pp. 1-4 (2001).
(1999) McMillan et al. "Fluoroethylene carbonate electrolyte and its use in lithium ion batteries with graphite anodes," Journal of Power Sources 81-2: 20-26 (1999) (Abstract).
(2007) Miyachi et al., "Elelctrochemical Properties and Chemical Structures of Metal-Doped SiO Anodes for Li-Ion Rechargeable Batteries," J. Electrochem. Soc. 154(4):A376-A380 (2007).
(2009) Naoi et al., "Nonflammable Hydrofluoroether for Lithium-Ion Batteries: Enhanced Rate Capability, Cyclability, and Low-Temperature Performance," J. Electrochem. Soc. 156(4):A272-A276 (2009) (Abstract only).
(2009) Profatilova et al., "Enhanced thermal properties of the solid electrolyte interphase formed on graphite in an electrolyte with fluoroethylene carbonate," Electrochimica Acta 54: 4445-4450 (2009).
Ruffo et al., "Impedance Analysis of Silicon Nanowire Lithium Ion Battery Anodes," J. Phys. Chem. C 113:11390-11398 (2009).
(2009) Schoenenberger et al., "Multiwall carbon nanotubes," http://physicsworld.com/cws/article/print/606 (printed Oct. 7, 2009).
(2001) Shi et al., "Nano-SnSb alloy deposited on MCMB as an anode material for lithium ion batteries," J. Materials Chemistry, 11(5):1502-1505 (2001).
(2007-AIF3 Coating) Sun et al., "AlF3-Coating to Improve High Voltage Cycling Performance of Li[Ni1/3Co1/3Mn1/3] O2 Cathode Materials for Lithium Secondary Batteries," J. of the Electrochemical Society, 154 (3), A168-A172 (2007).
(2006 EC) Sun et al., "Significant Improvement of high voltage cycling behavior AIF3-coated LiCoO2 cathode," Electrochemistry Communications 8:821-826 (2006).
(2005) Tabuchi et al., "Li-doping process for LixSiO-negative active material synthesized by chemical method for lithiumion cells," Journal of Power Sources 146:507-509 (2005).
(2006) Thackeray et al., "Comments on the structural complexity of lithium-rich Li1+xM1-xO2 electrodes (M=Mn,Ni,Co) for lithium batteries," Electrochemistry Communications 8:1531-1538 (2006).
(2009) Veluchamy et al., "Improvement of cycle behaviour of SiO/C anode compositie by thermochemically generated Li4SiO4 inert phase for lithium ion batteries," Journal of Power Sources 188:574-577 (2009).
Wang et al., "Lithium Insertion in Carbon-Silicon Composite Materials Produced by Mechanical Milling," J. Electrochem. Soc., 145(8): 2751-2758 (1998).
(2007-SunYK) Woo et al., "Significant Improvement of Electrochemical Performance of AIF3-Coated Li [Ni0.8Co0.1Mn0.1]O2 Cathode Materials," J. of the Electrochemical Society, 154 (11) A1005-A1009 (2007).
(2006) Yamaki et al., "Characterization and Thermal Stability of SEI between a Graphite Electrode and Methyl Difluoroacetate-based Electrolyte," Abstract #236 from the 210th Meeting of the Electrochemical Society (2006).
(2007) Yang et al., "Nanosized silicon-based composite derived by in situ mechanochemical reduction for lithium ion batteries," Journal of Power Sources, 164, pp. 880-884 (2007).
(2005) Yoshio et al., "Electrochemical behaviors of silicon based anode material," Journal of Power Sources 146:10-14 (2005).
Veluchamy et al., "A new SiO/C Anode Composition for Lithium-ion Battery," Journal of Power Sources, 179:367-370 (2008).
Yang et al., "SiOx-based anodes for secondary lithium batteries," Solid State Ionics, 152-153:125-129 (2002).
Wang et al., "Nano-sized SiOx/C Composite Anode for Lithium Ion Batteries," Journal of Power Sources, 196:4811-4815 (2011).

(56) References Cited

OTHER PUBLICATIONS

Hu et al., "Superior Storage Performance of a Si@SiOx/C Nanocomposite as Anode Material for Lithium-Ion Batteries," Agnewandte Chemie International Edition, 2008, 47, 1645-1649, available Feb. 2008.

\* cited by examiner

SILICON-BASED ACTIVE MATERIALS FOR LITHIUM ION BATTERIES AND SYNTHESIS WITH SOLUTION PROCESSING

GOVERNMENT RIGHTS

Development of the inventions described herein was at least partially funded with government support through U.S. Department of Energy grant ARPA-E-DE-AR0000034 and California Energy Commission grant ARV-09-004, and the U.S. government has certain rights in the inventions.

FIELD OF THE INVENTION

The invention relates to high capacity silicon based negative electrode active materials for lithium ion batteries. The invention further relates to methods of forming the materials and batteries incorporating the materials.

BACKGROUND

Lithium batteries are widely used in consumer electronics due to their relatively high energy density. For some current commercial batteries, the negative electrode material can be graphite, and the positive electrode materials can comprise lithium cobalt oxide ($LiCoO_2$), lithium manganese oxide ($LiMn_2O_4$), lithium iron phosphate ($LiFePO_4$), lithium nickel oxide ($LiNiO_2$), lithium nickel cobalt oxide ($LiNiCoO_2$), lithium nickel cobalt manganese oxide ($LiNiMnCoO_2$), lithium nickel cobalt aluminum oxide ($LiNiCoAlO_2$) and the like. For negative electrodes, lithium titanate is an alternative to graphite with good cycling properties, but it has a lower energy density. Other alternatives to graphite, such as tin oxide and silicon, have the potential for providing increased energy density. However, some high capacity negative electrode materials have been found to be unsuitable commercially due to high irreversible capacity loss and poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency.

New positive electrode active materials are presently under development that can significantly increase the corresponding energy density and power density of the corresponding batteries. Particularly promising positive electrode active materials are based on lithium rich layered-layered compositions. In particular, the improvement of battery capacities can be desirable for vehicle applications, and for vehicle applications the maintenance of suitable performance over a large number of charge and discharge cycles is important.

SUMMARY OF THE INVENTION

In a first aspect, the invention pertains to a silicon-silicon oxide-carbon composite composition comprising nanoscale silicon embedded within a matrix comprising a silicon oxide-carbon composite. Generally, the composite can comprise from about 45 weight percent to about 80 weight percent nanoscale silicon. The nanoscale silicon can comprise elemental silicon having an average particle diameter of no more than about 250 nm, nanostructured silicon having a BET surface area from about 20 $m^2/g$ to about 150 $m^2/g$ or a combination thereof.

In a further aspect, the invention pertains to an anode material comprising a composite of elemental silicon and silicon suboxide and an inert elemental metal coated over the active material wherein the metal coating is inert relative to lithium alloying and wherein the material exhibits a room temperature deintercalation/dealloying capacity against a lithium counter electrode of at least about 2000 mAh/g at a discharge rate of C/20 from 1.5V to 0.005V.

In other aspects, the invention pertains to a method for forming nanostructured elemental silicon, the method comprising heating a precursor composition to at least about 450° C. to reduce a silicon composition. The precursor composition comprises particulate metal that can reduce silicon in a matrix of a crosslinked silicon composition.

In additional aspects, the invention pertains to a silicon-silicon oxide-carbon composite comprising nanostructured elemental silicon embedded within a matrix comprising a silicon oxide-carbon composite, in which the nanostructured silicon has submicron pores and a BET surface area of at least about 20 $m^2/g$.

Moreover, the invention pertains to a silicon-silicon oxide-carbon composite material comprising nanoscale silicon embedded within a silicon oxide-carbon matrix material having a discharge specific capacity of at least about 1000 mAh/g at a rate of C/20 and a 50th cycle discharge specific capacity of at least about 90% of the 5th cycle discharge capacity when discharged at a rate of C/3 from 1.5V to 0.005V against lithium.

Furthermore, the invention pertains to a method for the formation of a silicon oxide-carbon composite. In some embodiments, the method comprises pyrolyzing a precursor composition in a substantially oxygen free atmosphere to form the silicon oxide-carbon composite wherein the precursor composition comprises a sol-gel formed by the cross-linking of tetraalkoxysilane and an alkylalkoxysilane.

DETAILED DESCRIPTION

Figure 1A:
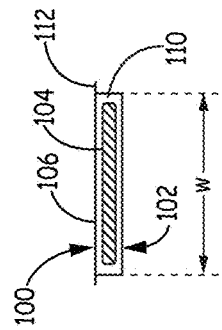
FIG. 1(a) is a schematic diagram of a pouch cell battery having approximate rectangular parallelepipeds configuration.

Silicon based negative electrode active materials are described that can be effectively formed with solution based processing steps while forming materials with desirable performance properties. In particular, high specific capacity materials can comprise nanoscale elemental silicon and/or silicon oxide-carbon composites with synthesis based on solution phase synthesis steps. For embodiments of the active materials that comprise nanoscale elemental silicon components, very high specific capacities can be obtained, and incorporation into the various composites described herein provides for improved cycling within lithium ion batteries. In some embodiments, silicon oxide-carbon contributions of the composite material can be effectively supplied either as a pyrolysis product of a polysiloxane polymer or a silicon oxide sol gel. A nanostructured elemental silicon component can be introduced effectively as elemental silicon nanoparticles and/or as nanostructured porous silicon, which may be also formed with a solution based processing step. Coatings of electrically conductive stabilizing material, e.g., pyrolytic carbon or inert elemental metal coatings, can be deposited with solution based techniques to provide for significant increase in specific capacity as well as providing significant stabilization. The processes described herein generally relate to the formation of silicon-based composites that can exhibit improved cycling while providing a relatively high specific capacity and a relatively low irreversible capacity loss. The negative electrode active materials can be particularly useful in combination with recently developed high capacity positive electrode active materials for the formation of lithium ion batteries with good performance.

Solution based processing can be desirable from a scale up perspective with respect to modest capital expenses and reasonable operating expenses. Thus, the processes described herein are desirable from a commercial standpoint. Also, the processes can yield materials with high specific capacities and good cycling properties.

The silicon based active materials can comprise elemental silicon and/or silicon suboxide as a primary active material. To stabilize these materials as well as to increase electrical conductivity, carbon and/or metal can be incorporated into a composite active material. Composites of silicon oxide and carbon can be effectively formed using solution based methods as described herein, and the product composite can be used alone or especially for high capacity materials as a matrix with nanoscale elemental silicon. Also, carbon nanofibers, or other nanoscale carbon components, can be milled with nanoscale silicon to form a nanoscale silicon constituent for further processing. With respect to solution approaches for synthesizing silicon oxides, precursor materials generally comprise organic siloxane components that produce a silicon oxide-carbon composite upon pyrolyzing in an oxygen deficient atmosphere or oxygen free atmosphere. With respect to the composites with nanoscale elemental silicon and silicon oxide-carbon composite matrix, it has been found that high specific capacities and good performance can be achieved with modest relative amounts of elemental silicon, specifically no more than about a ratio of 3 of nanoscale silicon to silicon oxide-carbon composite material. The resulting composite can further comprise additional conductive sources, such as carbon nanofibers, pyrolytic carbon and/or elemental metal coating.

For some of the materials, elemental silicon is provided due to the high inherent specific capacity of elemental silicon. To achieve reasonable cycling of the elemental silicon in the active material, the active materials can comprise nanoparticulate silicon or nanostructured porous silicon, which can be formed from metal driven reduction of a silicon composition. The nanostructured porous silicon can be effectively processed with solution based methods to form a structure that may be nanoporous or otherwise to have a high surface area characteristic of nanostructured material such that the material can cycle in a battery with more stability in view of significant volume changes of the material during lithium uptake and release. Applicants have found that moderate amounts of elemental silicon can be included in the active materials while still achieving high specific capacities and with good cycling.

As with silicon, oxygen deficient silicon oxide, e.g., silicon oxide, $SiO_x$, $0.1 \leq x \leq 1.9$, can intercalate/alloy with lithium such that the oxygen deficient silicon oxide can perform as an active material in a lithium based battery. The oxygen deficient silicon oxide can incorporate a relatively large amount of lithium such that the material can exhibit a large specific capacity. However, silicon oxide is observed generally to have a capacity that fades quickly with battery cycling, as is observed with elemental silicon. In particular, composites can be formed with electrically conductive components that contribute to the conductivity of the electrode as well as the stabilization of the silicon oxide during cycling.

Lithium has been used in both primary and secondary batteries. An attractive feature of lithium metal for battery use is its light weight and the fact that it is the most electropositive metal, and aspects of these features can be advantageously captured in lithium-based batteries also. Certain forms of metals, metal oxides, and carbon materials are known to incorporate lithium ions into its structure through intercalation, alloying or similar mechanisms. The positive electrode of a lithium based battery generally comprises an active material that reversibly intercalates/alloys with lithium, e.g., a metal oxide. Lithium ion batteries generally refer to batteries in which the negative electrode active material is also a lithium intercalation/alloying material.

The batteries described herein are lithium based batteries that use a non-aqueous electrolyte solution which comprises lithium ions and their anions as a counterpart. For secondary lithium ion batteries during charge, oxidation takes place in the cathode (positive electrode) where lithium ions are extracted and electrons are released. During discharge, reduction takes place in the cathode where lithium ions are inserted and electrons are consumed. Similarly, during charge, reduction takes place at the anode (negative electrode) where lithium ions are taken up and electrons are consumed, and during discharge, oxidation takes place at the anode with lithium ions and electrons being released. Unless indicated otherwise, performance values referenced herein are at room temperature, i.e., about 23±2° C. As described below some of the testing of the silicon based active materials is performed in lithium batteries with a lithium metal electrode or in lithium ion batteries.

The word "element" is used herein in its conventional way as referring to a member of the periodic table in which the element has the appropriate oxidation state if the element is in a composition and in which the element is in its elemental form, M°, only when stated to be in an elemental form. Therefore, a metal element generally is only in a metallic state in its elemental form or an appropriate alloy of the metal's elemental form. In other words, a metal oxide or other metal composition, other than metal alloys, generally is not metallic.

When lithium ion batteries are in use, the uptake and release of lithium from the positive electrode and the negative electrode induces changes in the structure of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss (IRCL) is the difference between the charge capacity of the new battery and the first discharge capacity. The irreversible capacity loss results in a corresponding decrease in the capacity, energy and power for the battery due to changes in the battery materials during the initial cycle.

Silicon based materials exhibit a large irreversible capacity loss, as described further below. In some embodiments, the battery can comprise supplemental lithium, which can compensate for the first cycle irreversible capacity loss of the silicon based materials as well as stabilize the cycling of the battery. The supplemental lithium can replace some or all of the active lithium removed from the cycling as a result of the irreversible capacity loss of the silicon based material associated with first cycle changes in the silicon based active material. In a traditional lithium ion battery, the lithium for cycling is supplied only by a positive electrode active material comprising lithium metal oxide. The battery is initially charged to transfer lithium from the positive electrode to the negative electrode where it is then available for discharge of the battery. Supplemental lithium results from a supply of active lithium other than the positive electrode active material. It has also been found that supplemental lithium can be very effective for the stabilization of lithium rich high capacity positive electrode active materials. See, published U.S. patent application 2012/0107680 to Amiruddin et al., entitled, "Lithium Ion Batteries With Supplemental Lithium," (hereinafter "the '680 application") incorporated herein by reference. Thus, good cycling has been obtained for realistic lithium ion batteries with supplemental lithium to have relatively high specific capacities. Supplemental lithium, for example, can be supplied by elemental lithium, lithium alloys, a sacrificial lithium source or through electrochemical lithiation of the negative electrode prior to completion of the ultimate battery.

Active silicon compositions can be elemental silicon, silicon sub-oxides, silicon alloys or the like. The silicon can be introduced as a liquid silicon precursor and/or as nano-structured, e.g., nano-particulate, elemental silicon. Liquid silicon precursors can be sintered to form silicon oxide or a silicon oxide-carbon composite material. Elemental nano-structured silicon can be a desirable constituent of the composites to provide for a higher specific capacity, although some of the materials described herein may not have clearly identified elemental silicon domains.

Elemental silicon has attracted significant amount of attention as a potential negative electrode material due to its very high specific capacity with respect to intake and release of lithium. Silicon forms an alloy with lithium, which can theoretically have a lithium content corresponding with more than 4 lithium atoms per silicon atom (e.g., $Li_{4.4}Si$). Thus, the theoretical specific capacity of silicon is on the order of 4000-4400 mAh/g, which is significantly larger than the theoretical capacity of about 370 mAh/g for graphite. Graphite is believed to intercalate lithium to a level of roughly 1 lithium atom for 6 carbon atoms ($LiC_6$). Also, elemental silicon, silicon alloys, silicon composites and the like can have a low potential relative to lithium metal similar to graphite. However, silicon undergoes a very large volume change upon alloying with lithium. A large volume expansion on the order of two to three times of the original volume or greater has been observed, and the large volume changes have been correlated with a significant decrease in the cycling stability of batteries having silicon-based negative electrodes. Silicon suboxide, i.e., $SiO_x$, x<2, have also been found to be desirable active materials for lithium based batteries, which can have in some embodiments high specific capacities with respect to lithium alloying.

To improve the cycling performance of elemental silicon anode, nanoscale silicon can be used to form the composite materials described herein. For example, nanoparticulate silicon with an average particle diameter of no more than about 250 nm can be used as a component of the composite. Also, it has been discovered that nanostructured silicon, e.g., highly porous with nanoscale pores, can be formed from the reduction of silicon oxide, silicates or silanes. The formation of porous nanostructured silicon from the reduction of silicon oxide is described in copending U.S. patent application Ser. No. 13/354,096 to Anguchamy et al. (the '096 application), entitled "Porous Silicon Based Anode Material Formed Using Metal Reduction," incorporated herein by reference. Solution based reduction approaches are described herein for the formation of elemental silicon and/or silicon suboxide, which are both referred to as nanostructured elemental silicon for convenience. The nanostructured silicon formed with a solution deposition step can have an x-ray diffractogram indicating a crystalline elemental silicon phase. The nanostructured elemental silicon introduces desirable features with respect to stability for the intercalation/alloying and release of lithium. Nanoscale silicon can be a significant component for the formation of the composites described herein since the nanoscale silicon can be effectively used consistently with the porous nature of a silicon oxide-carbon composite matrix, and the porous nature of the composite materials can contribute to more stable cycling at high capacity.

Due to the very high specific capacity of elemental silicon with respect to lithium uptake and release, it has been found that good performance properties and high specific capacity can be achieved with nanoscale silicon-silicon oxide-carbon composites. Various solution processable silicon oxide-carbon sources can be effectively used for formation of the composite matrix for the elemental silicon, although an active material with a moderately high specific capacity can be formed from the silicon oxide-carbon matrix material itself. In general, the solution processing to form the nanoscale silicon-silicon oxide-carbon composite material can be performed by pyrolysis in an oxygen deficient atmosphere or oxygen free atmosphere in the presence of the nanoscale silicon to form an intimately associated composite material with several phases that can be active electrochemically within the battery. Each of the phases of material can have a functional role in the electrochemistry as well as in the mechanical stability of the material.

Carbon composites have been found to provide some stabilization of high specific capacity silicon. See published U.S. patent application 2011/0111294 to Lopez et al. (the '294 application), entitled "High Capacity Anode Materials for Lithium Ion Batteries," incorporated herein by reference. Silicon suboxide materials can also function as negative electrode active materials for lithium ion batteries with relatively high specific capacities. The silicon suboxide materials can be combined into composites with carbon components and/or nanostructured silicon to achieve composite materials with good battery performance See U.S. patent application 2012/0295155 to Deng et al., entitled "Silicon Oxide Based High Capacity Anode Materials for Lithium Ion Batteries," incorporated herein by reference. The silicon suboxide-carbon-n-Si composites described herein provide comparable or better cycling performance with desirable processing approaches.

The formation of silicon oxide-carbon material through the pyrolysis of polysiloxane polymers to form composites with silicon is described in U.S. Pat. No. 7,790,316 to Aramata et al., entitled "Silicon Composite Particles, Preparation Thereof, and Negative Electrode Material for Non-Aqueous Electrolyte Secondary Cell," incorporated herein by reference. As described herein the materials are formed with improved forms of nanoscale silicon with ratios of constituents that provide desirable electrochemical properties. In some embodiments described herein, sol-gel precursor compositions are used to supply precursors of the silicon oxide-carbon composite matrix material.

With respect to the polysiloxane polymer based composite materials, polysiloxane polymers with —SiH groups are combined with another precursor having unsaturated alkene or alkyne functional groups along with a catalyst that drives an additive crosslinking reaction. The crosslinked polymer system provides a precursor material for silicon oxide-carbon composite matrix. With respect to sol-gel precursors, alkoxy silanes can provide sol-gel precursors for silicon oxide materials, and the gel formation with alkylalkoxy silanes combined with alkoxy silanes provides a sol-gel precursor material for the formation of silicon oxide-carbon composite matrix. The silicon oxide-carbon precursor materials can be pyrolyzed in an oxygen deficient atmosphere or oxygen free atmosphere to form the silicon oxide-carbon composite matrix materials.

In general, an elemental silicon based active material can be combined into the solution phase processing to form the silicon oxide-carbon precursors. The precursors are then combined with a high capacity active material. Thus, when the precursors are pyrolyzed into the silicon oxide-carbon composite matrix, the high capacity silicon component generally is intimately embedded in the silicon oxide-carbon matrix. Suitable high capacity silicon components include submicron silicon particles, nanostructured porous elemental silicon, nanoscale silicon-nanoscale carbon composites and combinations thereof.

Inert elemental metal coatings can be used to increase the electrical conductivity as well as to stabilize the material with respect to electrochemical cycling. Solution based processes for the formation of inert metal coatings are described herein that are effective for providing surprisingly improved cycling stability to the materials. For example, copper can be reduced with an organic reducing agent, e.g., formaldehyde, to form a copper coating in the presence of the active material. The solution based metal reduction can be facilitated with the complexation of the metal ions in solution with a chelating agent of the like to avoid the formation of a metal oxide rather than the metal. It is expected that the solution based approach can provide uniform coating of the material as well as a convenient processing approach for commercial scale production. The metal for these composites is generally selected to be inert with respect to reaction both with silicon oxide so that the metal does not reduce the silicon oxide and with lithium so that the metal does not alloy with lithium under conditions to be experienced in the batteries. Significantly improved cycling is observed with the copper coating, so that evidence suggests very significant stabilization from the metal coating.

The solution based metal coating can be contrasted with milling to form composites with metal. While the milling approach of silicon based active material with metal particles can result in desirable composite materials, the solution based metal coating approaches described herein can be desirable due to the solution processing capabilities as well as the observed performance improvement associated with the metal coatings. It is believed that the solution based metal coating can provide significant uniformity of the metal coating. A high energy mechanical milling approach to the formation of composites with silicon based active materials is described further in the '155 application cited above. The '155 application further suggests that metal coating can be deposited using solution based metal reduction, and the present work establishes that excellent stabilization results from the solution deposited metal coatings.

The overall performance of the battery is based on the capacities of both the negative and positive electrodes and their relative balance. Supplemental lithium can replace at least part of the lithium that does not cycle due to an irreversible capacity loss of the negative electrode, which can be large for silicon based negative electrode active materials. Furthermore, it has been discovered that the inclusion of supplemental lithium can stabilize positive electrodes based on lithium rich layered-layered lithium metal oxide compositions out to large number of cycles. This improvement in cycling of the positive electrode active material is described in the '680 application cited above. The benefit of supplemental lithium to batteries with high capacity anode material that have carefully balanced negative and positive electrode capacities is discussed in the '294 application and the '155 application, both cited above.

The negative electrode active materials described herein can exhibit high specific capacities with good cycling performance out to a moderate number of cycles. The active materials can also be synthesized using convenient solution based techniques. Thus, the active materials can be suitable for commercial applications such as for the manufacture of vehicle batteries.

Battery Structure

In general, the lithium ion battery described herein comprises a positive electrode comprising a lithium intercalation material and a negative electrode comprising a lithium intercalation/alloying material. The nature of the positive electrode active material and the negative electrode active material influences the resulting voltage of the battery since the voltage is the difference between the half cell potentials at the cathode and anode. As described in detail below with respect to specific battery designs, the batteries generally have a positive electrode or cathode, a negative electrode or anode with a separator layer between the positive electrode and negative electrode, separate current collectors associated with the respective electrodes, electrolyte for ion mobility and a container. For larger capacity secondary batteries, an electrode stack with a plurality of electrodes of each polarity are generally assembled in a stack.

Suitable positive electrode active materials are described below, and the materials of particular interest are lithium metal oxides. Generally, suitable negative electrode lithium intercalation/alloying compositions can include, for example, graphite, synthetic graphite, coke, fullerenes, other graphitic carbons, niobium pentoxide, tin alloys, silicon, silicon alloys, silicon-based composites, titanium oxide, tin oxide, and lithium titanium oxide, such as $Li_xTiO_2$, $0.5<x\leq1$ or $Li_{1+x}Ti_{2-x}O_4$, $0\leq x\leq 1/3$. However, as described herein, improved negative electrode active materials generally comprise high capacity silicon-based materials, which can comprise silicon-oxide-carbon composite material and/or metal coatings. Silicon based active materials take up lithium to form an alloy and release lithium from the alloy to correspondingly release lithium, and have a relatively low potential relative to lithium such that they can be substituted for lithium without dramatic changes in voltage of the resulting battery in comparison with a corresponding battery with a lithium metal negative electrode. Negative electrode active materials of particular interest are described in detail below.

The positive electrode active compositions and negative electrode active compositions generally are powder compositions that are held together in the respective electrode with a polymer binder. The binder allows for ionic conductivity to the active particles when in contact with the electrolyte. Suitable polymer binders include, for example, polyvinylidine fluoride (PVDF), polyethylene oxide, polyimide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. In particular, thermally curable polyimide polymers have been found desirable for high capacity silicon-based electrodes, which may be due to their high mechanical strength. The following Table 1 provides suppliers of polyimide polymers, and names of corresponding polyimide polymers.

TABLE 1

| Supplier | Binder |
| --- | --- |
| New Japan Chemical Co., Ltd. | Rikacoat PN-20; Rikacoat EN-20; Rikacoat SN-20 |
| HD MicroSystems | PI-2525; PI-2555; PI-2556; PI-2574 |
| AZ Electronic Materials | PBI MRS0810H |
| Ube Industries. Ltd. | U-Varnish S; U-Varnish A |
| Maruzen petrochemical Co., Ltd. | Bani-X (Bis-allyl-nadi-imide) |
| Toyobo Co., Ltd. | Vyromax HR16NN |

With respect to polymer properties, some significant properties for electrode application are summarized in the following Table 2.

TABLE 2

| Binder | Elongation | Tensile Strength (MPa) | Elastic Modulus | Viscosity (P) |
| --- | --- | --- | --- | --- |
| PVDF | 5-20% | 31-43 | 160000 psi | 10-40 |
| Polyimide | 70-100% | 150-300 | | 40-60 |
| CMC | 30-40% | 10-15 | | 30 |

PVDF refers to polyvinylidene fluoride, and CMC refers to sodium carboxy methyl cellulose. The elongation refers to the percent elongation prior to tearing of the polymer. In general, to accommodate the silicon based materials, it is desirable to have an elongation of at least about 50% and in further embodiments at least about 70%. Similarly, it is desirable for the polymer binder to have a tensile strength of at least about 100 MPa and in further embodiments at least about 150 MPa. Tensile strengths can be measured according to procedures in ASTM D638-10 Standard Test Method for Tensile Properties of Plastics, incorporated herein by reference. A person of ordinary skill in the art will recognize that additional ranges of polymer properties within the explicit ranges above are contemplated and are within the present disclosure. The particle loading in the binder can be large, such as greater than about 80 weight percent. To form the electrode, the powders can be blended with the polymer in a suitable liquid, such as a solvent for the polymer. The resulting paste can be pressed into the electrode structure.

The active particle loading in the binder can be large, such as greater than about 80 weight percent, in further embodiments at least about 83 weight percent and in other embodiments from about 85 to about 97 weight percent active material. A person of ordinary skill in the art will recognize that additional ranges of particles loadings within the explicit ranges above are contemplated and are within the present disclosure. To form the electrode, the powders can be blended with the polymer binder in a suitable liquid, such as a solvent for the polymer binder. The resulting paste can be pressed into the electrode structure.

The positive electrode composition, and in some embodiments the negative electrode composition, generally can also comprise an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, an electrode can comprise from about 1 weight percent to about 25 weight percent, and in further embodiments from about 2 weight percent to about 20 weight percent and in other embodiments from about 3 weight percent to about 15 weight percent distinct electrically conductive powder. A person of ordinary skill in the art will recognize that additional ranges of amounts of electrically conductive powders within the explicit ranges above are contemplated and are within the present disclosure. Specific electrically conductive materials for high capacity negative electrodes are described further below.

Each electrode generally is associated with an electrically conductive current collector to facilitate the flow of electrons between the electrode and an exterior circuit. A current collector can comprise a metal structure, such as a metal foil or a metal grid. In some embodiments, a current collector can be formed from nickel, aluminum, stainless steel, copper or the like. An electrode material can be cast as a thin film onto a current collector. The electrode material with the current collector can then be dried, for example in an oven, to remove solvent from the electrode. In some embodiments, a dried electrode material in contact with a current collector foil or other structure can be subjected to a pressure from about 2 to about 10 kg/cm$^2$ (kilograms per square centimeter).

The separator is located between the positive electrode and the negative electrode. The separator is electrically insulating while providing for at least selected ion conduction between the two electrodes. A variety of materials can be used as separators. Commercial separator materials can be formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. Polymer-ceramic composites for lithium ion battery separators are sold under the trademark Separion® by Evonik Industries, Germany.

The electrolyte provides for ion transport between the anode and cathode of the battery during the charge and discharge processes. We refer to solutions comprising solvated ions as electrolytes, and ionic compositions that dissolve to form solvated ions in appropriate liquids are referred to as electrolyte salts. At least some of the irreversible capacity loss can be attributed to the formation of a solvent electrolyte interphase layer associated with the electrodes, and in particular with the negative electrode. Electrolytes for lithium ion batteries can comprise one or more selected lithium salts. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, and combinations thereof. Traditionally, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in published U.S. patent applications 2011/0136019 to Amiruddin et al. entitled: "Lithium ion battery with high voltage electrolytes and additives", incorporated herein by reference.

The porous silicon based material described herein can be incorporated into various commercial battery designs such as prismatic shaped batteries, wound cylindrical batteries, coin cell batteries, or other reasonable battery shapes. The batteries can comprise a single pair of electrodes or a plurality of pairs of electrodes assembled in parallel and/or series electrical connection(s). While the materials described herein can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used, as well as prismatic cells and foil pouch batteries of selected sizes.

Figure 1B:
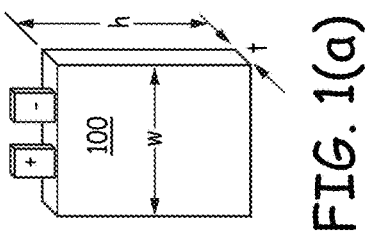
FIG. 1(b) is a schematic diagram of the pouch cell battery of FIG. 1(a) with the pouch enclosure, battery core, and pouch cover of the battery taken apart and illustrated separately.
Figure 1C:
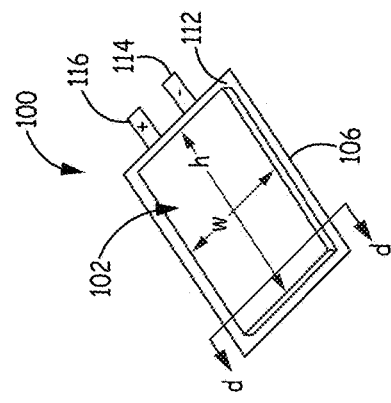
FIG. 1(c) is an illustration of a perspective view of the sealed battery of FIG. 1(b) with the pouch cover at the bottom.
Figure 1D:
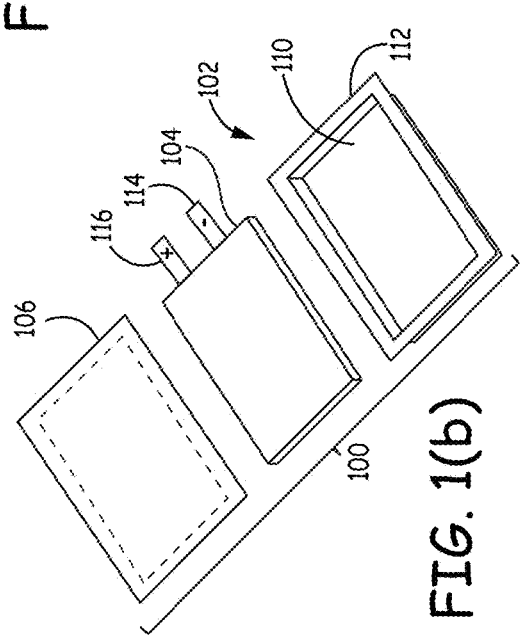
FIG. 1(d) is a sectional view of the battery of FIG. 1(c) viewed along the d-d line.

Pouch cell batteries can be particularly desirable for vehicle applications due to stacking convenience and relatively low container weight. A representative embodiment of a pouch battery is shown in FIGS. 1(a)-1(e). Specifically, pouch cell battery 100 as shown in FIG. 1(a) as a generally approximate rectangular parallelepiped, excluding the connection tabs and other potential features around the edges, characterized by a thickness (t) and a planar area with a width (w) and a height (h) in which the thickness is generally significantly less than the linear dimensions (width and height) defining the planar area (w·h). The pouch enclosure 102, battery core 104 and pouch cover 106 of the battery 100 is taken apart and illustrated in FIG. 1(b). As shown in FIG. 1(b), terminal tabs 114, 116 extend outward from the battery core 104. Pouch enclosure 102 comprises a cavity 110 and edge 112 surrounding the cavity. Cavity 110 has dimensions such that battery core 104 can fit within cavity 110. Pouch cover 106 can seal around edge 112 to seal battery core 104 within the cavity 110 to form the sealed battery 100. FIG. 1(c) is an illustration of a perspective view of the sealed battery 100 with the pouch cover 106 at the bottom and the cavity 110 showing as protrusion from the pouch cover 106. Terminal tabs 114, 116 are shown extending outward from the sealed pouch for electrical contact. FIG. 1(d) is a schematic diagram of a cross section of the battery 100 viewed along the d-d line of FIG. 1(c). Specifically, battery core 104 is shown to be encased inside the cavity 110 of the pouch enclosure 102 sealed along the edge 112 with pouch cover 106. Many additional embodiments of pouch batteries are possible with different configurations of the edges and seals. However, reasonable configurations of the pouch batteries can take advantage of the desired design parameters described herein.

Figure 1E:
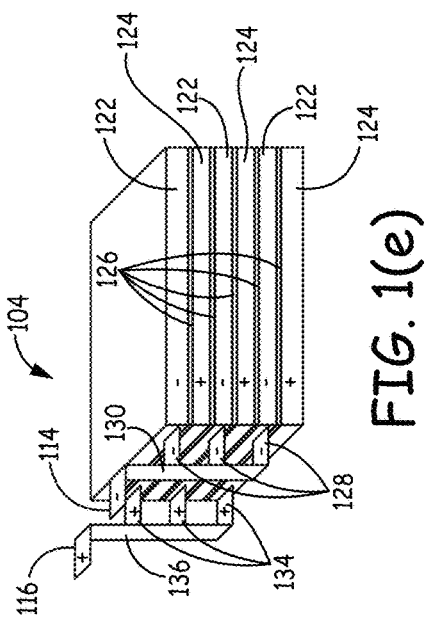
FIG. 1(e) is a schematic representative illustration of a battery core that comprises three negative electrode structures, three positive electrode structures, and five separators.

In the embodiments of particular interest herein, the electrodes are stacked in battery core 104 with a stack of positive electrodes (cathodes) and negative electrodes (anodes) with a sheet of separator between adjacent electrodes of opposite parity. For secondary batteries designed to operate at reasonable rates for most applications, it has been found that the electrodes perform appropriately if they are not too thick, and anode loading levels are explored in the examples. Appropriate electrically conductive tabs can be welded or the like to the current collectors to form current collector tabs. Generally, the electrode plates in the stack of like polarity are connected in parallel. In other words, current collector tabs of the positive electrodes are connected, e.g., welded or the like, to a common electrical conductive element, and the current collector tabs of the negative electrodes are connected to a common electrical conductive element. Suitable electrically conductive elements include, for example, a metal strip, wire or the like. With a parallel connection, the capacity of the battery is the sum of the capacities available from the individual electrodes. The battery core can be placed into the pouch, with the negative terminal tab and the positive terminal tab extending from the pouch packaging material to provide connection to appropriate external contacts. Electrolyte is added to the pouch, and the pouch is sealed to complete the battery. Referring to FIG. 1(e), a schematic representative battery core 104 comprises three negative electrode structures (a current collector with an electrode on both surfaces of the current collector) 122, three positive electrode structures 124, and five separators 126, with the electrodes of like polarity electrically connected in parallel. The separator 126 is placed between each adjacent negative electrode 122 and positive electrode 124. Generally, each negative electrode 122 may be associated with a current collector having a tab 128, which is in turn connected to an electrically conductive element 130 with the conductive terminal tab 114. Similarly, each positive electrode 124 may be associated with a current collector having a tab 134, which is in turn connected to an electrically conductive element 136 with the conductive terminal tab 116. Of course, the battery core may generally have a greater number of electrodes than shown in FIG. 1(e), and typical battery designs have one more anode than cathode such that the stack has an anode at each end of the stack.

A desirable pouch battery design for vehicle batteries incorporating a high capacity cathode active materials is described in detail in published U.S. patent applications 2009/0263707 to Buckley et al, entitled "High Energy Lithium Ion Secondary Batteries" and copending U.S. patent application Ser. No. 13/195,672 to Kumar et al. (the '672 application), entitled "Battery Packs for Vehicles and High Capacity Pouch Secondary Batteries for Incorporation into Compact Battery Packs," both incorporated herein by reference. While the pouch battery designs are particularly convenient for use in specific battery pack designs, the pouch batteries can be used effectively in other contexts as well with high capacity in a convenient format. Specific designs for batteries for vehicle use incorporating high capacity positive electrode active material and negative electrode active material are described in detail in copending U.S. patent application Ser. No. 13/777,722 to Masarapu et al., entitled "Battery Designs With High Capacity Anode Materials and Cathode Materials," incorporated herein by reference.

Negative Electrode Active Material

The high capacity negative electrode materials comprise silicon based active materials that can be combined with suitable coatings to stabilize the materials during electrochemical lithium uptake and release. Silicon based active materials can comprise elemental silicon, silicon suboxide or combinations thereof, in which the elemental silicon and/or silicon suboxide can contribute a high specific capacity. With respect to desired active materials described herein, elemental silicon can be a nanoscale material, which can imply that the material has submicron particles, e.g., an average particle diameter of no more than about 250 nm, or comprises a highly porous nanostructured particulates. Highly porous nanostructured elemental silicon can be obtained by the metal reduction of a silicon composition, for example, silicon oxide, polysiloxane or a silicate. As described herein silicon suboxides can be synthesized through the oxygen limited pyrolysis of an organic siloxane or of an organic sol-gel silicon oxide precursor composition, which can be referred to collectively as silicon oxide-carbon precursor materials. The pyrolysis of the silicon oxide-carbon precursor materials produces a silicon oxide-carbon composite matrix material, which can be combined with nanoscale elemental silicon to form a high capacity material with promising cycling properties. In particular, it has been found that moderate amounts of elemental silicon can contribute to high specific capacities that can be cycled well.

Coatings can be placed over the materials to stabilize the materials with respect to the electrochemical properties. Pyrolytic carbon has been found to provide significant stabilization with respect to cycling of the materials. In particular, inert metal has been found to provide stabilization also. As described herein, solution based metal deposition has been found to be particularly effective with respect to stabilizing silicon based active materials. The solution based metal deposition is believed to form a metal coating over the nanostructured active material.

Nanoscale Elemental Silicon

Nanoscale elemental silicon can be provided by submicron silicon particles, highly porous nanostructured elemental silicon or combinations thereof. Highly porous nanostructured elemental silicon can be synthesized from reduction of silicon oxide, or, as described herein, from the reduction of dissolved silicon precursors. The nanoscale elemental silicon can contribute a very high specific capacity component to composite compositions incorporating the silicon. The solution based processing can provide desirable synthesis formats for the formation of nanostructured elemental silicon, although the resulting composition may be only partially reduced so that additional oxidized forms of silicon can remain in the material.

Submicron silicon particles can be amorphous, crystalline or mixtures thereof and are generally commercially available or can be produced by etching of silicon wafers. See, for example, the '294 application above. Commercial silicon nanoparticles are available from, for example, Nanostructured and Amorphous Materials, Inc. (TX, U.S.A.) In general, submicron silicon particles can have an average primary particle diameter of no more than about 250 nm, in further embodiments no more than about 200 nm and in further embodiments no more than about 125 nm. Primary particles are the visible particulate structures visible on a transmission electron micrograph whether or not dispersible. A person of ordinary skill in the art will recognize that additional ranges of average particle diameters within the explicit ranges above are contemplated and are within the present disclosure.

Metal reduction of silicon oxide ($SiO_2$, silica) has been found to yield elemental silicon with promising cycling properties. The initial product can be etched to remove the product metal oxide to leave a highly porous nanostructured silicon powder. The resulting nanostructured elemental silicon can exhibit a very high specific capacity with very good cycling properties. These nanostructured silicon materials from the reduction of silica is described further in the '096 application cited above.

An alternative approach to the formation of nanostructured elemental silicon is described herein based on the reduction of solutions of silicon compositions using a reducing metal. Suitable solutions of silicon compositions can be provided, for example, as solutions of silicates or polysiloxanes. Polysiloxanes are commercially available or can be synthesized from derivatives of alkylalkoxysilanes. In general suitable solvents can comprise water, alcohols, such as ethanol or isopropanol, combinations thereof or other solvents that suitably dissolve the precursor compositions. The pH of the solution is generally made basic to control oxidation of the metal during the formation of the precursor material. The reduced silicon compositions are found to form crystalline elemental silicon as determined by X-ray diffraction. The reduction of the precursor material described herein can produce high BET surface area material indicating that the material is very porous. In particular, the material can have a BET surface area of at least about 20 $m^2/g$, in further embodiments from about 30 $m^2/g$ to about 150 $m^2/g$ and in additional embodiments from about 35 $m^2g$ to about 140 $m^2/g$. A person of ordinary skill in the art will recognize that additional ranges of BET surface areas within the explicit ranges above are contemplated and are within the present disclosure. The solution based nanostructured elemental silicon material seems to be particularly sensitive to coating stabilization.

The mole ratio of Si oxide to reducing metal in the precursor material can be controlled to yield a desired material. Suitable metal powders include, for example, magnesium powder, aluminum powder or combinations thereof. In general, the selected mole ratio depends on the product oxidation state of the reducing metal, and the ratio of silicon to metal can be selected at a greater than stoichiometric value to obtain a material with remaining oxidized silicon to a value less than stoichiometric to obtain a material with little or no remaining oxidized silicon. For magnesium reducing metal, the mole ratio of $SiO_x$ to reducing metal is in the range from about 0.2 to about 1.5, in further embodiments from about 0.25 to about 1.25, in other embodiments from about 0.3 to about 1.1 and in additional embodiments from about 0.3 to about 0.8. These mole ratios can be correspondingly adjusted for the valence of other reducing metals. After mixing the precursor materials well in solution, the precursor material is precipitated as described further below for precipitation with silicates and polysiloxanes. The precipitated precursor materials can be dried, which generally involves heating with or without reduced pressure for an appropriate period of time, generally for at least 15 minutes, and in some embodiments for 30 minutes to 12 hours. The dried precursor material can be milled if desired prior to performing the reduction reaction with heat. A person of ordinary skill in the art will recognize that additional ranges of reactant ratios and drying times within the explicit ranges above are contemplated and are within the present disclosure.

The reduction process is driven then with a heating step to temperatures from about 500° C. to about 900° C., in further embodiments from about 525° C. to about 850° C. and in other embodiments from about 550° C. to about 800° C. Generally, the reduction process can be performed for about 10 minutes to about 20 hours, in further embodiments for about 15 minutes to about 12 hours and in other embodiments for about 20 minutes to about 8 hours. A person of ordinary skill in the art will recognize that additional ranges of temperature and time within the explicit ranges above are contemplated and are within the present disclosure. The reduction product can be washed with acidic solution, e.g., 10% HCl, to remove metal oxide and then with distilled water. The washed product can be dried and ground. The product material can exhibit x-ray diffraction peaks characteristic of crystalline elemental silicon.

Precipitation of the silicates, e.g., sodium silicate, generally can be performed by mixing metal powder with the silicate solution and then precipitating the silicate. The cation of the silicate can be selected to be inert with respect to the metal powders, and the cations from the silicates may be washed out from the materials in a later wash step. The precipitation can be driven through the addition of a less polar or non-polar organic solvent, such as acetone. An intimate mixture results from the precipitation. The precipitate can be washed and dried. Milling, such as high energy mechanical milling, or other blending can be performed to increase the contact area between the silicate composition and the metal reducing particles. The reduction can be performed and the product material processed as described above.

A polyalkoxysiloxane, alkylalkoxysilane monomers or mixtures thereof can be dissolved in an alcohol solvent, such as ethanol, and mixed with the metal powder. A catalyst solution, e.g., an alkaline fluoride solution such as ammonium hydroxide with some added ammonium fluoride in an aqueous alcohol solution, can be added to the mixture to precipitate the precursor material generally through crosslinking and/or polymerization. The material then can form a gel, which can be dried to form a precursor material for further processing to drive the reduction process as described above.

With the use of alkylsiloxanes, it is believed that carbon is retained in the material following the pyrolysis since the C—Si bonds resist volatilization of the carbon component. The carbon then can remain within the material in some pyrolytic carbon like state. Elemental analysis of the samples confirming the presence of carbon is described in the Examples below.

Silicon Oxide-Carbon Composite Matrices and their Formation

Silicon suboxides, e.g., $SiO_x$, $0.1 \leq x \leq 1.9$, can exhibit high specific capacities with respect to lithium uptake and release. Synthesis approaches are described herein for the solution phase synthesis of silicon suboxide precursor materials that can be pyrolyzed to form in a silicon oxide-carbon composite material. The product materials are highly porous and can be confirmed with micrographs and BET surface area measurements. Surface area measurements are described further in the context of composites with nanoscale silicon below. Silicon oxide precursors can be a sol-gel system or a composition comprising polysiloxanes. Organic constituents of the precursor material, in principle, can be pyrolyzed in a substantially oxygen free atmosphere into a carbon material, e.g., a pyrolytic carbon. A substantially oxygen free atmosphere refers to an oxygen free atmosphere or an atmosphere having such a low amount of oxygen as to not result in a significant amount of carbon oxidation during heating. Since the precursor materials are pyrolyzed in a substantially oxygen free atmosphere, the resulting silicon oxide material would be expected to be oxygen deficient, and the electrochemical properties of the product composite material are found to support the conclusion that a silicon suboxide is formed. Thus, the resulting silicon oxide-carbon composites can exhibit reasonably large specific capacities. However, these materials can be particularly effective as a support matrix for nanoscale elemental silicon materials, as described in the following section, in which a composite material is formed in the presence of added nanoscale elemental silicon.

A sol-gel material that is a precursor to silicon oxide can be formulated with organic functional groups to supply a carbon constituent that can be pyrolyzed in a substantially oxygen free environment to form carbon. Thus, the modified sol-gel materials can form silicon oxide-carbon composites upon pyrolysis in a substantially oxygen free environment. If polysiloxanes are pyrolyzed in an oxygen containing atmosphere, the polymer can form $SiO_2$ with carbon removed as gaseous carbon dioxide and/or carbon monoxide. If organic polymers are pyrolyzed in an oxygen deficient or oxygen free atmosphere, a pyrolytic carbon can be formed with a dominant elemental carbon constituent, e.g., an amorphous carbon, carbon black or the like. If pyrolyzed in an oxygen deficient or oxygen free atmosphere, it would be expected that the polysiloxane may decompose to form a silicon suboxide, and the carbon component can form a pyrolytic carbon, and electrochemical results support this concept. To facilitate the pyrolysis for the formation of a desired composite, the polymer can be crosslinked with a crosslinking agent and a catalyst.

As noted above, in some embodiments, composite precursors can be formed using silicon-based sol-gel compositions. Alkoxy silanes can form silica type sol-gels at appropriate concentrations. The alkoxy groups are hydrolysable at appropriate pH values so that a Si—O network can form as a gel. To introduce carbons into the condensed materials, alkyl alkoxy silanes can be introduced, and these can be combined with tetraalkoxy silanes to promote sol-gel formation. For example, tetraethoxysilane (TEOS) can be one reactant. Also, a tetraalkoxysilane can be mixed with the alkylalkoxy silane, such as dimethyldiethoxysilane, diphenyldimethoxysilane, trimethylmethoxysilane, combinations thereof or the like. In general, the tetraalkoxysilane comprises from about 5 weight percent to about 50 weight percent of the sol-gel precursors. The sol-gel precursor compositions can be mixed in an alcohol, and a small quantity of an acid and water can be added to induce gel formation. The resulting gel can be gradually heated to slowly evaporate the alcohol solvent and to further crosslink the sol-gel. Furthermore, the dried sol-gel material can be further reacted at a temperature from about 100° C. to about 300° C. for a time of at least about 5 minutes and in some embodiments for from about 10 minutes to about 10 hours to further cure/crosslink the sol-gel material. A person of ordinary skill in the art will recognize that additional ranges of precursor quantities, curing temperatures and curing times within the explicit ranges above are contemplated and are within the present disclosure.

With respect to forming a polymer based precursor to the composite material, the polysiloxane polymer can be crosslinked with a polyfunctional crosslinking agent in the presence of a catalyst for addition based crosslinking, such as rhodium and/or a platinum based catalyst, for example, platinum metal or platinum compounds. The crosslinked polymers are less volatile during the pyrolysis reaction such that the desirable composite materials are formed. The crosslinking agents generally have carbon-carbon double bonds. Suitable polysiloxanes have —SiH groups, which can react with the C═C bonds to form chemical crosslinks. In general, the ratio of polysiloxane polymer to crosslinking agent can be selected based on the equivalence ratios of the functional groups. Specifically, the ratio of SiH groups to C═C groups can be from about 50:1 to about 1:2, in further embodiments, from about 20:1 to about 1:1 and in additional embodiments from about 10:1 to about 1.5:1. A person of ordinary skill in the art will recognize that additional ranges of weight ratios within the explicit ranges above are contemplated and are within the present disclosure.

Suitable polysiloxane polymers include, for example, polyhydrogenmethylsiloxane, hydrogen terminated polydimethylsiloxane, mixtures thereof and the like. Suitable polysiloxanes can be linear or branched polymers. Suitable copolymers include, for example, copolymers of polyhydrogenmethylsiloxane and polydimethylsiloxane, polymethylphenylsiloxane, and/or polydiphenylsiloxane. In some embodiments, the polymers have molecular weight ranges from 750-2500 amu, although other ranges can be used if desired.

Suitable crosslinker compounds may or may not comprise silicon. The crosslinking compounds generally comprise an alkene or alkyne functional group for crosslinking. Specifically, suitable organic crosslinking agents include, for example, organic polyalkenes, e.g., dialkenes, such as divinyl benzene, diallyl maleate, diallyl phthalate, combinations thereof or the like. With respect to silicon containing crosslinking agents, suitable compounds include, for example, silanes with a plurality of double bonded carbon functional groups or a single double bonded carbon functional group and an alkoxysilane group, for example, vinyl alkoxy silane, e.g., vinylmethoxysilane, vinylethoxysilane, 1,3,5,7-tetravinyl-1,3,5,7-tetramethyl-cyclotetrasilane, mixtures thereof and the like. The crosslinking reaction can be driven by a catalyst, such as a platinum catalyst or rhodium catalyst, which can be added in a relatively small quantity.

The crosslinking reaction takes place upon mixing the component compositions with the catalyst. To drive the crosslinking reaction further to completion, some heating can be applied, such as from about 40° C. to about 300° C. and in further embodiments from about 80° C. to about 250° C., for reasonable periods of time, such as from about 5 minutes to about 10 hours and in further embodiments from about 10 minutes to about 7 hours. The heating to drive the crosslinking reaction can be performed in two stages, such as a first heating step from 40° C. to about 100° C., and a second heating step from about 120° C. to about 300° C. The heating time can be appropriately split between these heating stages. The crosslinking reaction can be performed over an inert atmosphere. A person of ordinary skill in the art will recognize that additional ranges of temperatures and times for the crosslinking within the explicit ranges above are contemplated and are within the present disclosure.

Following performing the crosslinking reaction, the precursor material, i.e., the crosslinked polymer or sol-gel composition, is pyrolyzed in an oxygen deficient or oxygen free atmosphere to react the composition to form a silicon oxide-carbon material with a corresponding release of gaseous byproducts. For example, the atmosphere can comprise nitrogen, argon or other inert atmosphere. As described above, the precursor materials are believed to form a silicon oxide-carbon composite matrix material upon an oxygen deficient pyrolysis. The pyrolysis can be performed at temperatures from about 750° C. to about 1200° C. and in further embodiments from about 800° C. to about 1100° C. The pyrolysis can be performed from about 10 minutes to about 10 hours, and in further embodiments from about 20 minutes to about 6 hours. A person of ordinary skill in the art will recognize that additional ranges of temperatures and times within the explicit ranges above are contemplated and are within the present disclosure. The crosslinking of the materials, either polymer or sol-gel, is found to stabilize the material with respect to volatilization during the pyrolysis process. In general, the yield of the pyrolysis reaction can range from about 30 weight percent to about 80 weight percent, which seems to vary depending on the degree of crosslinking, and yields are observed to be very low, such as below 10 weight percent, for uncrosslinked polymers.

Milled Graphite and/or Nanoscale Carbon with Submicron Silicon Particles

High energy mechanical milling can be used to form a nano-silicon-graphite or carbon nanofiber composite, which can be further stabilized through the various composite materials described herein. In general, it has been found that the addition of electrically conductive additives to the high capacity anode materials can be beneficial with respect to electrochemical performance. In particular, graphite and nanoscale carbon particles, e.g. carbon particles, carbon fibers and/or carbon nanotubes, have been found to be particularly effective to improve the properties of the resulting silicon based composite compositions. Nanoscale carbon provide for good electrical conductivity and can provide a support structure for silicon based active material such that the stress of alloy formation with lithium can be reduced. In general, graphite and/or nanoscale carbon can be introduced during processing prior to performance of various heating steps to form product compositions such that the nanoscale carbon particulates are integrally incorporated into the materials. For example, nanoscale carbon particulates can be added similarly to nanoscale silicon in the processing of silicon-silicon oxide-carbon composites as described below, and the nanoscale carbon can be added prior to, after or simultaneously with nanoscale silicon. However, it can be particularly desirable to use high energy mechanical milling of the graphite and/or nanoscale carbon with the nanoscale silicon prior to performing further processing. In general, the active material can comprise up to about 15 weight percent graphite/nanoscale carbon particulates, in further embodiments from about 0.25 to about 12 weight percent and in other embodiments from about 0.5 to about 10 weight percent graphite/nanoscale carbon particulates. A person of ordinary skill in the art will recognize that additional ranges of nanoscale carbon particulates within the explicit ranges are contemplated and are within the present disclosure.

suppliers. Suitable suppliers are summarized in Table 3, which has parts A and B.

TABLE 3A

| Fiber | Company | Product ID | Length (μm) | Diameter (nm) |
|---|---|---|---|---|
| 1 | Showa Denko | VGCF-H | 10-20 | 150 |
| 2 | Nano-vision tech | GNF-100 | ~30 | ~200 |
| 3 | | GNF-L | ~30 | ~300 |
| 4 | Nanostructured & amorphous materials Inc. | GNF | 10-40 | 200-500 OD & 1-10 core |
| 5 | Cytek carbon Inc | Cytek | 10 | |
| 6 | Pyrograph products Inc. | PR19-XT-HHT | | 150 |
| 7 | | PR25-XT-HHT | | 100 |

TABLE 3B

| Fiber | Powder resistivity (W-cm) | Specific surface area (m²/g) | Bulk density (g/cm³) | True density (g/cm³) | Purity |
|---|---|---|---|---|---|
| 1 | 0.01-0.015 at 0.8 g/cm³ | 13 | 0.04 | 2 | 0.1% ash |
| 2 | | 100-300 | 0.15-0.18 | | >90% |
| 3 | | 100 | 0.12-0.15 | | >90% |
| 4 | ~0.06 at 0.8 g/cm³ | <25 | 0.15-0.25 | 1.9 | ~99.8% & 0.2% Fe |
| 5 | | 0.012 | | 1.9 | |
| 6 | | 15-25 | | | Fe <100 ppm |
| 7 | | ~40 | | | Fe <100 ppm |

Graphite powders are available from commercial suppliers. Various nanoscale carbon particles with generally spherical shapes are commercially available, and are generally referred to as carbon blacks with other specific names based on their synthesis approach, such as acetylene black, furnace black, or the like. Carbon black can have average particle sizes from about 20 nm to about 250 nm. A commercial carbon black is Super P™ from Timcal, Ltd, Switzerland. Conductive carbon nanotubes are commercially available, and can generally be multiwall nanotubes or single wall nanotubes. The nanotubes have a diameter of a nanometer or less to 10s of run with lengths that can be long, generally at least many microns. Commercial carbon nanotube suppliers include, for example, Chengdu Organic Chemicals Co., Ltd. (China), Hanwha Nanotech (Korea), Nanoshel (India), Continental Carbon Corp. (TX, U.S.A.), SES Research (TX, U.S.A.), Yunnan Guorui Nano-tech Co., Ltd. (China), American Dye Source, Inc. (Canada), Any International Group Limited (Germany), Carbon Nano Materials R&D Center (China), Carbon Nanotechnologies Inc. (U.S.A.) and many others.

Carbon nanofibers can be obtained or can be synthesized using a vapor organic composition and a catalyst in a suitable thermal reaction. One approach for the synthesis of carbon nanofibers are described in published U.S. patent application 2009/0053608 to Choi et al., entitled "Anode Active Material Hybridizing Carbon Nanofiber for Lithium Secondary Battery," incorporated herein by reference. Carbon fibers are available commercially from a variety of In general, suitable carbon nanofibers can have average diameters of about 25 nm to about 250 nm and in further embodiments, from about 30 nm to about 200 nm, and with average lengths from about 2 microns to about 50 microns, and in further embodiments from about 4 microns to about 35 microns. A person of ordinary skill in the art will recognize that additional ranges of nanofiber average diameters and lengths within the explicit ranges above are contemplated and are within the present disclosure.

High energy mechanical milling can be performed, for example, with a ball mill or the like, and can make use of zirconium oxide powder or the like as a milling medium. Milling media can be removed following milling. The milling speed and milling time can be adjusted to achieve desired combination of the materials. The resulting nanoscale silicon-nanoscale carbon composite can be further processed as described herein for the processing of nanoscale silicon.

Composites of Nanostructured Silicon—Silicon Oxide and Carbon

Desirable composites can be formed through the inclusion of elemental nanoscale silicon during the formation of the silicon oxide-carbon composite matrix. To form the composites, the nanoscale silicon is mixed with the solution comprising the precursor materials prior to crosslinking the materials to form the condensed precursors of the silicon oxide-carbon composites. Alkoxysilane groups can hydrolyze to form bonds with silicon particle surfaces. It is believed that the nanoscale silicon is intimately incorporated into the composite material due to its presence as an intimate component of the precursor material during the pyrolysis of the precursors to form the silicon oxide-carbon material. In general, the silicon oxide-carbon matrix can stabilize the elemental silicon with respect to electrochemical performance while contributing to the capacity due to the presence of silicon suboxide. In general, moderate amounts of the high capacity elemental silicon can be included to form an overall composite with desirable properties. The product materials generally are highly porous as evaluated with micrographs and BET surface area measurements.

Suitable nanoscale elemental silicon is discussed above, and also suitable precursors for the silicon oxide-carbon matrix material are also discussed above. Generally, all combinations of specific elemental silicon types can be combined with any particular silicon oxide-carbon matrix material. For example, silicon submicron particles and/or nanostructured elemental silicon/silicon suboxide can be combined with sol-gel precursors and/or polysiloxane precursors for the formation of composites. Also, each combination of species for each component of the ultimate composite which can be formed is explicitly contemplated and described herein. The elemental silicon provides a significant fraction of the electrochemical capacity of the composite, but it is found that relatively high specific capacity and good cycling performance can be obtained with moderate amounts of elemental silicon.

As noted above, the yield of the silicon oxide-carbon matrix material following pyrolysis is generally observed to be about 30 wt % to about 75 wt %, and it is believed that similar yield of this component follow in the context of these composites. Thus, with respect to the composites, the relative amounts of the components in the product can be adjusted based on the added precursors and the yields of the matrix materials. In some embodiments, with respect to the added precursor amounts prior to pyrolysis, the precursor weight ratios of elemental silicon to silicon oxide-carbon matrix can be no more than about 3, in further embodiments from about 0.25 to about 2.5 and in additional embodiments from about 0.4 to about 2. With respect to the product material accounting for yield of the matrix material, the weight ratios of elemental silicon to silicon oxide-carbon matrix can be from about 0.9 to about 5, in further embodiments from about 0.95 to about 4.5 and in other embodiments from about 1 to about 4. Thus, the composite can comprise from about 40 weight percent to about 85%, in further embodiments from about 45 weight percent to about 80 weight percent and in additional embodiments form about 50 weight percent to about 75 weight percent nanoscale silicon. The product material can have a BET surface area of at least about 20 m$^2$/g, in further embodiments at least about 25 m$^2$/g and in additional embodiments from about 30 m$^2$/g to about 120 m$^2$/g. A person of ordinary skill in the art will recognize that additional ranges of yields, quantities of component materials and BET surface areas within the explicit ranges above are contemplated and are within the present disclosure.

The formation protocols for forming the silicon oxide-carbon composites are generally followed as described above with an added step of incorporating the nanoscale silicon. For the sol-gel based materials, the silicon oxide generally can be added and mixed with the solution of sol-gel precursors prior to adjusting the pH to crosslink or gel the precursors. Similarly, with the polysiloxane based materials, the nanoscale silicon can be mixed with the polymer and crosslinking agent prior to initiation of the crosslinking reaction. In this way, the nanoscale silicon can be intimately integrated with the matrix precursor materials, possibly with bonding to the silicon. Optionally, milling can be performed prior to the pyrolysis step to form the composite silicon-silicon oxide-carbon composite.

Coatings

Coatings have been found to be helpful to stabilize high capacity silicon based materials, and the silicon based materials described herein can be similarly stabilized. In particular, inert metal coatings formed from solution phase deposition can be particularly effective to provide cycling stability and increase specific capacity at higher rates. The inert metal can be deposited by a reduction of a metal composition dissolved in the solution, and the solution phase deposition is expected to provide good coverage of the surface of the active material to improve electrical conductivity and to stabilize the material during cycling. Alternatively, pyrolytic carbon coatings can also provide stability to the materials. In some embodiments, the pyrolytic carbon coatings can be formed by pyrolyzing an organic polymer deposited onto the material.

Specifically, inert metals can be deposited by reducing a metal solution mixed with the silicon based active material to deposit the metal onto the silicon based active material. Suitable elemental metals include metals that can be reduced under reasonable conditions to form an inert metal in the battery. Suitable metals include, for example, silver, copper, nickel, chromium, iron, zinc or cobalt, which are generally inert with respect to lithium insertion and extraction from the material. In general, the coated active material can comprise from about 0.1 to about 20 weight percent, in further embodiments from about 0.2 to about 15 weight percent and in other embodiments from about 0.3 to about 12 weight percent inert metal coating. A person of ordinary skill in the art will recognize that additional ranges of metal quantities within the explicit ranges above are contemplated and are within the present disclosure.

A solution based approach can be used to apply the metal coating. For example, the silicon oxide based material to be coated can be mixed with an aqueous solution comprising dissolved salt of the metal, such as silver nitrate, silver chloride, copper sulfate, copper nitrate, copper chloride or the like, and a reducing agent can be added to deposit the metal coating. Some heat can be added to facilitate the reduction reaction. Suitable reducing agents include, for example, sodium hypophosphite, sodium borohydride, hydrazine, formaldehyde, sugars and the like. A reducing agent can be added gradually with mixing to induce the reduction reaction and form the coating. Sufficient reducing agent can be added to perform the reduction. In some embodiments, the metal salt solution can be stabilized with an appropriate amount of a chelating agents, such as EDTA (ethyelendaminetetraacetic acid or base form), TEA (triethanolamine), EN (ethylenediamine), sodium guanate, combinations thereof or the like. A chelating agent can stabilize the metal solution, for example, by inhibiting the precipitation of a hydroxide, such as cupric hydroxide, or an oxide such as silver oxide. The pH can be adjusted to control the reduction reaction. In some embodiments, the chelating agent can be included in the solution by weight as 0.1 to 25 times the weight of metal salt. A person of ordinary skill in the art will recognize that additional ranges of chelating agent within the explicit range above are contemplated and are within the present disclosure.

Previous work has shown some advantage in forming a composite with inert metals to stabilize silicon based active materials, as described in the '155 application cited above. The '155 application exemplifies high energy mechanical milling with metals as well as describes metal reductions to form coatings. As described herein, very significant performance improvements have been observed with inert metal coatings deposited from solution phase reduction.

As an alternative or in addition to inert metal coatings, pyrolytic carbon can be coated onto the silicon based material described herein. Carbon coatings formed from coal tar pitch is described in published PCT patent application WO 2005/011030 to Lee et al., entitled "A Negative Active Material for Lithium Secondary Battery and a Method for Preparing Same," incorporated herein by reference. In contrast, an organic composition can be dissolved in a suitable solvent and mixed with the active material. The solvent is removed through drying to form a solid precursor coated active material. This approach with a solvent for delivering a solid pyrolytic carbon precursor can facilitate formation of a more homogenous and uniform carbon coating. Then, the precursor coated material is heated in an effectively oxygen free environment to form the pyrolytic carbon coating.

For the formation of pyrolytic carbon coatings, the heating generally can be performed at a temperature of at least about 500° C., and in further embodiments at least about 700° C. and in other embodiments, from about 750° C. to about 1350° C. Generally, if temperatures are used above about 800° C., a hard carbon coating is formed. The heating can be continued for a sufficient period of time to complete the formation of the carbon coating. In some embodiments, it is desirable to use pyrolytic carbon precursors that can be delivered in a solvent to provide for good mixing of the precursors with the silicon oxide based materials and to provide for a range of desired precursor compounds. For example, desirable precursors can comprise organic compositions that are solids or liquids at room temperature and have from two carbon atoms to 40 carbon atoms, and in further embodiments from 3 carbon atoms to 25 carbon atoms as well as other ranges of carbon atoms within these ranges, and generally these molecules can comprise other atoms, such as oxygen, nitrogen, sulfur, and other reasonable elements. Specifically, suitable compounds include, for example, sugars, other solid alcohols, such as furfuryl alcohol, solid carboxylic acids, such as citric acid, polymers, such as polyacrylonitrile, and the like. The coated materials generally comprise no more than about 50 weight percent pyrolytic carbon, in further embodiments no more than about 40 weight percent, and in additional embodiments, from about 1 weight percent to about 30 weight percent. A person of ordinary skill in the art will recognize that additional ranges within the explicit ranges above of amounts of coating composition are contemplated and are within the present disclosure.

High Capacity Positive Electrode Active Materials

In general, positive electrode (cathode) active materials comprise a lithium intercalation material such as lithium metal oxides or lithium metal phosphates. Positive electrode active materials include, for example, as stoichiometric layered cathode materials with hexagonal lattice settings like $LiCoO_2$, $LiNiO_2$, $LiCo_{1/3}Mn_{1/3}Ni_{1/3}O_2$ or the like; cubic spinel cathode materials such as $LiMn_2O_4$, $Li_4Mn_5O_{12}$, or the like; olivine materials, such as $LiMPO_4$ (M=Fe, Co, Mn, combinations thereof and the like). Lithium rich positive electrode active materials are of interest due to their high capacity, such as layered cathode materials, e.g., $Li_{1+x}(NiCoMn)_{0.33-x}O_2$ ($0 \le x<0.3$) systems; layered-layered composites, e.g., $xLi_2MnO_3 \cdot (1-x)LiMO_2$ where M can be Ni, Co, Mn, combinations thereof and the like; and composite structures like layered-spinel structures such as $LiMn_2O_4 \cdot LiMO_2$. In some embodiments, a lithium rich composition can be referenced relative to a composition $LiMO_2$, where M is one or more metals with an average oxidation state of +3.

In some embodiments, the lithium rich compositions can be represented approximately with a formula $Li_{1+x}M_{1-y}O_2$, where M represents one or more non-lithium metals and y is related to x based on the average valance of the metals. In layered-layered composite compositions, x is approximately equal to y. The additional lithium in the initial cathode material can provide to some degree corresponding additional active lithium for cycling that can increase the battery capacity for a given weight of cathode active material. In some embodiments, the additional lithium is accessed at higher voltages such that the initial charge takes place at a higher voltage to access the additional capacity.

Lithium rich positive electrode active materials of particular interest are represented approximately by a formula $$Li_{1+b}Ni_\alpha Mn_\beta Co_\gamma A_\delta O_{2-z}F_z, \qquad \text{Formula I}$$

where b ranges from about 0.05 to about 0.3, α ranges from about 0 to about 0.4, β ranges from about 0.2 to about 0.65, γ ranges from 0 to about 0.46, δ ranges from 0 to about 0.15 and z ranges from 0 to about 0.2 with the proviso that both α and γ are not zero, and where A is a metal element different from Ni, Mn, Co, or a combination thereof. Element A and F (fluorine) are optional cation and anion dopants, respectively. Element A can be, for example Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit compositional ranges above are contemplated and are within the present disclosure. To simplify the following discussion in this section, the optional dopants are not discussed further except for under the context of the following referenced applications. The use of a fluorine dopant in lithium rich metal oxides to achieve improved performance is describe in published U.S. patent application 2010/0086854 to Kumar et al., entitled "Fluorine Doped Lithium Rich Metal Oxide Positive Electrode Battery Materials With High Specific Capacity and Corresponding Batteries," incorporated herein by reference. The specific performance properties obtained with +2 metal cation dopants, such as $Mg^{+2}$, are described in copending U.S. patent application Ser. No. 12/753,312 to Karthikeyan et al., entitled "Doped Positive Electrode Active Materials and Lithium Ion Secondary Batteries Constructed Therefrom," incorporated herein by reference.

The formulas presented herein for the positive electrode active materials are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

The stoichiometric selection for the compositions can be based on some presumed relationships of the oxidation states of the metal ions in the composition. As an initial matter, if in Formula I above, $b+\alpha+\beta+\gamma+\delta$ is approximately equal to 1, then the composition can be correspondingly approximately represented by a two component notation as:

$$x\text{Li}_2\text{M'O}_3\cdot(1-x)\text{LiMO}_2 \qquad \text{Formula II}$$

where $0<x<1$, M is one or more metal cations with an average valance of +3 with at least one cation being a Mn ion or a Ni ion and where M' is one or more metal cations with an average valance of +4. It is believed that the layered-layered composite crystal structure has a structure with the excess lithium supporting the formation of an alternative crystalline phase. For example, in some embodiments of lithium rich materials, a $\text{Li}_2\text{MnO}_3$ material may be structurally integrated with either a layered $\text{LiMO}_2$ component where M represents selected non-lithium metal elements or combinations thereof. These compositions are described generally, for example, in U.S. Pat. No. 6,680,143 to Thackeray et al., entitled "Lithium Metal Oxide Electrodes for Lithium Cells and Batteries," which is incorporated herein by reference.

Recently, it has been found that the performance properties of the positive electrode active materials can be engineered around the specific design of the composition stoichiometry. The positive electrode active materials of particular interest can be represented approximately in two component notation as:

$$x\text{Li}_2\text{MnO}_3\cdot(1-x)\text{LiMO}_2 \qquad \text{Formula III}$$

where M is one or more metal elements with an average valance of +3 and with one of the metal elements being Mn and with another metal element being Ni and/or Co. In general, in Formula II and III above, the x is in the range of $0<x<1$, but in some embodiments $0.03 \leq x \leq 0.6$, in further embodiments $0.075 \leq x \leq 0.50$, in additional embodiments $0.1 \leq x \leq 0.45$, and in other embodiments $0.15 \leq x \leq 0.425$. A person of ordinary skill in the art will recognize that additional ranges within the explicit ranges of parameter x above are contemplated and are within the present disclosure. In some embodiments, M in Formula III comprises manganese, nickel, cobalt or a combination thereof along with an optional dopant metal and can be written as $\text{Ni}_u\text{Mn}_v\text{Co}_w\text{A}_y$, where A is a metal other than Ni, Mn or Co. Consequently Formula III now becomes:

$$x\cdot\text{Li}_2\text{MnO}_3\cdot(1-x)\text{LiNi}_u\text{Mn}_v\text{Co}_w\text{A}_y\text{O}_2 \qquad \text{Formula IV}$$

where $u+v+w+y\approx1$. While Mn, Co and Ni have multiple accessible oxidation states, which directly relates to their use in the active material, in these composite materials if appropriate amounts of these elements are present, it is thought that the elements can have the oxidation states $\text{Mn}^{+4}$, $\text{Co}^{+3}$ and $\text{Ni}^{+2}$. In the overall formula, the total amount of manganese has contributions from both constituents listed in the two component notation.

In some embodiments, the stoichiometric selection of the metal elements can be based on the above presumed oxidation states. Additionally, if $\delta=0$ in Formula I, the two component notation of Formula IV can simplify with v u to $x\cdot\text{Li}_2\text{MnO}_3\cdot(1-x)\text{LiNi}_u\text{Mn}_v\text{Co}_w\text{O}_2$, with $2u+w=1$. Also, compositions can be considered in which the composition varies around the stoichiometry with $v \approx u$. The engineering of the composition to obtain desired battery performance properties is described further in published U.S. patent application 2011/0052981 (the '981 application) to Lopez et al., entitled "Layer-Layer Lithium Rich Complex Metal Oxides With High Specific Capacity and Excellent Cycling," incorporated herein by reference. Similar compositions have been described in published U.S. patent application 2010/0086853A (the '853 application) to Venkatachalam et al. entitled "Positive Electrode Material for Lithium Ion Batteries Having a High Specific Discharge Capacity and Processes for the Synthesis of these Materials", and published U.S. patent application 2010/0151332A (the '332 application) to Lopez et al. entitled "Positive Electrode Materials for High Discharge Capacity Lithium Ion Batteries", both incorporated herein by reference.

The positive electrode material can be advantageously synthesized by co-precipitation and sol-gel processes detailed in the '853 application and the '332 application. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to one or more heat treatments to form a crystalline layered lithium metal oxide composition. A carbonate co-precipitation process described in the '332 application gave desired lithium rich metal oxide materials having cobalt in the composition and exhibiting the high specific capacity performance with superior tap density. These copending patent applications also describe the effective use of metal fluoride coatings to improve performance and cycling.

It is found that for many positive electrode active materials a coating on the material can improve the performance of the resulting batteries. Suitable coating materials, which are generally believed to be electrochemically inert during battery cycling, can comprise metal fluorides, metal oxides, metal non-fluoride halides or metal phosphates. The results in the Examples below are obtained with materials coated with metal fluorides.

For example, the general use of metal fluoride compositions as coatings for cathode active materials, specifically $\text{LiCoO}_2$ and $\text{LiMn}_2\text{O}_4$, is described in published PCT application WO 2006/109930A to Sun et al., entitled "Cathode Active Material Coated with Fluorine Compound for Lithium Secondary Batteries and Method for Preparing the Same," incorporated herein by reference. Improved metal fluoride coatings with appropriately engineered thicknesses are described in published U.S. patent application 2011/0111298 to Lopez et al, (the '298 application) entitled "Coated Positive Electrode Materials for Lithium Ion Batteries," incorporated herein by reference. Suitable metal oxide coatings are described further, for example, in published U.S. patent application 2011/0076556 to Karthikeyan et al. entitled "Metal Oxide Coated Positive Electrode Materials for Lithium-Based Batteries", incorporated herein by reference. The discovery of non-fluoride metal halides as desirable coatings for cathode active materials is described in published U.S. patent application 2012/0070725 to Venkatachalam et al., entitled "Metal Halide Coatings on Lithium Ion Battery Positive Electrode Materials and Corresponding Batteries," incorporated herein by reference. The synthesis approaches along with the coating provide for superior performance of the materials with respect to capacity as well as cycling properties. The desirable properties of the active material along with the use of desirable anode material described herein provide for improved battery performance.

Performance

The high capacity anode materials can have one or more active phases as well as optional inert coatings, as described above. In general, within this significant composition ranges for the composite materials described herein, desirable electrochemical performance results can be obtained. To the extent that various compositions may have particular attractions, the composition can be selected to yield particular performance properties. Electrodes formed with the silicon based materials can be tested against a lithium foil electrode to evaluate the capacity and the IRCL. Specifically, batteries assembled with a lithium foil electrode are cycled with the silicon based electrode functioning as a positive electrode (cathode) and the lithium foil functions as the negative electrode (anode). The batteries with a lithium foil electrode can be cycled over a voltage range, for example, from 0.005V to 1.5 V at room temperature. Alternatively, batteries can be formed with a positive electrode comprising a layered-layered lithium rich metal oxide in which the silicon oxide based electrode is then the negative electrode, and the battery can then be cycled between 4.5 volts and 1.0 volt at room temperature after initial activation in the first cycle, or another voltage window can be used. For the batteries with a lithium metal oxide-based positive electrode, the first cycle can be charged and discharged at a rate of C/20 and subsequent cycling can be at a rate of C/3 unless specified otherwise with charging at C/3, although other rates and variation of rates with cycle number can be selected for testing the battery performance. The specific discharge capacity is very dependent on the discharge rate. The notation C/x implies that the battery is discharged at a rate to fully discharge the battery to the selected voltage minimum in x hours.

For the batteries formed with a lithium metal oxide based positive electrode, the specific capacity of the battery can be evaluated against the weights of either anode active material or cathode active material, which involved division of the capacity by the respective weights. If supplemental lithium is included in the battery, the weight of the negative electrode active material can include the weight of the supplemental lithium since the supplemental lithium contributes to the negative electrode capacity. Using a high capacity positive electrode active material, the overall benefits of using a high capacity silicon oxide based negative electrode active material becomes even more beneficial. Based on the capacity of the battery, the specific capacities can be obtained by dividing the respective weight of the active materials in each electrode. It can be desirable to have high specific capacities for both electrodes.

In general, it can be desirable for the negative electrode to have a specific capacity at the tenth cycle of at least about 500 mAh/g, in further embodiments at least about 700 mAh/g, in some embodiments at least about 850 mAh/g, in additional embodiments at least about 1000 mAh/g, and in some embodiments at least about 1100 mAh/g at a discharge rate of C/3 when cycled between 1.5V and 0.005V against a lithium counter electrode based on the anode active weight. Comparable specific capacities can be obtained in a lithium ion battery with a high capacity lithium rich metal oxide cycled between 4.5V and 1.0V. Depending on the specific silicon oxide based active material, the lower voltage cutoff in the lithium ion battery can be selected to be 2.0V, 1.5V, 1.0V or 0.5V. In general, the lower voltage cutoff can be selected to extract a selected portion of the electrode capacity from about 92% to about 99%, and in further embodiments from about 95% to about 98% of the total capacity of the positive electrode. As noted above, it can be desirable to have a relatively high specific capacity for both electrodes when the positive electrode comprises a lithium rich metal oxide, and the battery can exhibit at a discharge rate of C/3 at the 50th cycle a positive electrode specific capacity of at least about 150 mAh/g and a negative electrode specific capacity of at least about 750 mAh/g, in further embodiments a positive electrode specific capacity of at least about 160 mAh/g and a negative electrode specific capacity of at least about 800 mAh/g, and in additional embodiments a positive electrode specific capacity of at least about 170 mAh/g and a negative electrode specific capacity of at least about 1000 mAh/g, when cycled between 4.5V and 1.0V. The batteries with lithium rich metal oxides and silicon oxide based materials can exhibit desirable cycling properties, and in particular the batteries can exhibit a discharge capacity decrease of no more than about 15 percent at the 50th discharge cycle relative to the 7th discharge cycle and in further embodiments no more than about 10 percent when discharged at a rate of C/3 from the 7th cycle to the 50th cycle. In some embodiments, particularly high values of specific capacity have been achieved with stable cycling to at least 50 cycles. In particular, the material can exhibit a 5th cycle specific capacity of at least about 1000 mAh/g, in some embodiments at least about 1200 mAh/g and in further embodiments from about 1400 mAh/g to about 2500 mAh/g at a discharge rate of C/3 with a 50th cycle discharge capacity at least about 90% and in further embodiments at least about 92% of the 5th cycle discharge capacity when discharged from 1.5V to 0.005V at a rate of C/3 against a lithium metal counter electrode. A person of ordinary skill in the art will recognize that additional ranges of specific capacity and other battery parameters within the explicit ranges above are contemplated and are within the present disclosure. In some embodiments, the batteries further include supplemental lithium to reduce the irreversible capacity loss and to stabilize the cycling of lithium rich metal oxides.

EXAMPLES

To test various negative electrode compositions, batteries were constructed and tested. In some of the Examples, electrodes formed with the negative electrode composition were tested in batteries against lithium foil as the counter electrode. Other coin cell batteries were formed with high capacity positive electrodes with the high capacity negative electrodes at different excess anode capacity with or without supplemental lithium. The general procedure for formation of the coin batteries is described in the following discussion. Additionally, the positive electrodes and the negative electrodes at different excess anode capacity with or without supplemental lithium were assembled into pouch cell batteries. The batteries were cycled over a relevant voltage range to evaluate performance. The individual examples below describe formulation of a silicon based negative electrode active material, and the performance results from the batteries. The batteries with silicon based negative electrode described herein in general were cycled by charging from the open circuit voltage to 4.6V and discharging between 4.6V and 1.5V in the first formation cycle and between 4.5V and 1.5V in the cycle testing for batteries with high capacity manganese rich (HCMR®) positive counter electrode or between 0.005V-1.5V for batteries with lithium foil counter electrode. With the lithium foil counter electrode used for testing purposes, the electrode with the silicon based material functions as the positive electrode for these batteries, but the electrode with the silicon based material may still be referred to as the "negative electrodes" for simplicity since in a commercial battery these electrodes would be used as negative electrodes. The batteries were discharged at a rate of C/10, C/5, and C/3 for the 1st and 2nd cycles, for the 3rd and 4th cycles, and for subsequent cycles, respectively. All percentages reported in the examples are weight percents.

Negative electrodes, i.e., electrodes formed with the silicon based material, were formed from specific composite materials, which are described further below. In general, a 20% polyimide binder solution in N-methyl-pyrrolidone ("NMP") (Sigma-Aldrich) was mixed with an electrically conductive carbon additive, such as acetylene black (Super P® from Timcal, Ltd., Switzerland) or carbon nanotubes for several hours. A powder of the silicon based active material was then added to the polyimide-NMP solution and mixed for about 2 hours to form a homogeneous slurry. The slurry was applied onto a copper foil current collector to form a thin, wet film and the laminated current collector was dried in a vacuum oven to remove NMP and to cure the polymer. The dried laminate contained at least 75 wt % porous silicon based active material and at least 2 wt % polyimide binder. The resulting electrodes were assembled with either a lithium foil counter electrode or with a counter electrode comprising a lithium metal oxide (LMO), such as high capacity manganese rich (HCMR®) lithium metal oxide material as synthesized in the '853 application, the '332 application, and the '981 application referenced above.

The examples below in general use HCMR™ positive material approximately described by the formula $xLi_2MnO_3 \cdot (1-x)LiNi_uMn_vCo_wO_2$ where x=0.3 or 0.5. Positive electrodes were formed from the synthesized HCMR™ powder by initially mixing it thoroughly with conducting carbon black (Super P™ from Timcal, Ltd, Switzerland) and either graphite (KS 6™ from Timcal, Ltd) or carbon nanotubes to form a homogeneous powder mixture. Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried positive electrode comprised at least about 75 weight percent active metal oxide, at least about 1 weight percent graphite, and at least about 2 weight percent polymer binder. Positive electrodes using HCMR™ positive electrode active material are generally referred to as HCMR™ electrodes.

For batteries with the lithium foil counter electrodes, the electrodes were placed inside an argon filled glove box for the fabrication of the coin cell batteries. Lithium foil (FMC Lithium) having thickness of roughly 125 micron was used as a negative electrode. A conventional electrolyte comprising a lithium salt and carbonate solvents, such as ethylene carbonate, diethyl carbonate and/or dimethyl carbonate, was used. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

For batteries with the HCMR™ counter electrodes, the silicon oxide based electrode and the HCMR™ electrode were placed inside an argon filled glove box. An electrolyte was selected to be stable at high voltages, and appropriate electrolytes with halogenated carbonates, e.g., fluoroethylene carbonate are described in copending U.S. patent application Ser. No. 13/325,367 to Li et al., entitled "Low Temperature Electrolyte for High Capacity Lithium Ion Batteries," incorporated herein by reference. Based on these electrodes and the high voltage electrolyte, the coin cell batteries were completed with separator and hardware as described above for the batteries with the lithium foil electrode.

Some of the batteries fabricated from a silicon based negative electrode and a HCMR® positive electrode can further comprise supplemental lithium. In particular, a desired amount of SLMP® powder (FMC Corp., stabilized lithium metal powder) was loaded into a vial and the vial was then capped with a mesh comprising nylon or stainless steel with a mesh size between about 40 µm to about 80 µm. SLMP® (FMC corp.) was then deposited by shaking and/or tapping the loaded vial over a formed silicon based negative electrode. The coated silicon based negative electrode was then compressed to ensure mechanical stability.

Batteries fabricated from a silicon based negative electrode and a HCMR® positive electrode can be balanced to have excess negative electrode material. The balancing was based on the ratio of the first cycle lithium insertion capacity of the silicon based negative electrode to the total available lithium in the battery which is the sum of the oxidation capacity of the supplemental lithium and the theoretical capacity of the HCMR® positive electrode. In particular, for a given silicon based active composition, the insertion and extraction capacities of the silicon based composition can be evaluated in a battery setting. For example, a battery that has a positive electrode comprising the silicon based active material with a counter lithium foil negative electrode can be constructed. The insertion and extraction capacities of the silicon based composition in the electrode equals to the first cycle battery capacity measured when lithium is intercalated/alloyed to the porous silicon based electrode to 5 mV and de-intercalated/de-alloyed to 1.5V at a rate of C/20. Specific values of the excess negative electrode balance are provided in the specific examples below. For batteries containing supplemental lithium, the amount of supplemental lithium was selected to approximately compensate for the irreversible capacity loss of the negative electrode.

The composite anode in general was prepared by mixing 80% composite material, 10% super-p, and 10% UBE binder in NMP and then coating the mixture on copper foil to form electrodes with a specific loading density. The laminated composite was dried and cross-linked at 120° C. for 40 min, 150° C. for 15 min, 200° C. for 20 min, and 240° C. for 50 min under a vacuum to form anode film. The anode film was used to fabricate batteries with lithium metal counter electrode. All batteries were electrochemically characterized in the range of 0.005 to 1.5V (2 cycles at C/20, 2 cycles at C/10, 2 cycles at C/5, the rest at C/3).

For the formation of various silicon oxide-carbon composites, liquid precursors are used in the following examples. These precursors include polyhydrogemethylsiloxane (PHMS), HTPDMS (hydride terminated polydimethylsiloxane(1000-1100), n=13-15), vinylmethoxysilane (VMS), 1,3,5,7 Tetravinyl-1,3,5,7 tetramethyl-cyclotetrasiloxane (TVTMS), divinyl benzene (DVB), tetraethoxysilane (TEOS), Dimethyldiethoxysilane (DMDS), Diphenyldimethoxysilane (DPDS), and trimethylmethoxysilane (TMMS).

Example 1—Preparation of SiO$_x$—C Composite from Polysiloxane Liquid Precursors Porous SiO$_x$—C composite was formed by the pyrolysis of crosslinked polysiloxanes systems with liquid precursors A and B that have reactive —SiH groups and double bonds respectively to provide for the crosslinking.

Specifically, to form a first sample, precursor A (e.g. 0.8 g PHMS) and precursor B (e.g. 0.47 g DVB) were uniformly mixed in 20 mL toluene or xylene in a drybox to form a reaction solution. Diluted Pt catalyst (0.2% Pt in xylene) was prepared by diluting 2.3% Platinum Divinyltetramethyldisiloxane complex (Gelest) with xylene. Eight drops of diluted Pt catalyst (0.2% in xylene) were added to the reaction solution under vigorous agitation at room temperature and the resulting reaction mixture gelled in 20 min. To further react the precursor, the gelled reaction mixture was heated at 70° C. for 2 hrs and then dried at the same temperature in a dry box or a vacuum oven. The dried sample is further cross-linked at 200° C. for 3 hrs with the ramping rate of 5° C./min to complete the reaction of the unreacted precursors under argon atmosphere in a quartz tube to form a further treated sample. The further treated sample was then sintered at 900° C. for 3 hrs under argon atmosphere before being ground in a mortar and sieved with 45 μm mesh to obtain the SiO$_x$—C composite powder. Three additional samples were prepared based on this general procedure as summarized in Table 4. The amount of precursors were selected to control the ratio of C=C bonds from precursor B to Si—H bonds from precursor A in the range of about 0.05 to about 0.3. In general, the yields of the sintering reaction ranged from 50 weight percent to 75 weight percent.

Elemental analysis was performed on a representative sample using energy-dispersive x-ray spectroscopy (EDX), which can give a rough estimate of elemental composition. An EDX analysis found carbon, oxygen and silicon in the following amounts: C 23 weight %, 34 atomic %; O 40 weight percent, 44 atomic percent; Si 36 weight %, 23 atomic %. Based on the processing conditions and elemental analysis, it is appropriate to believe that the carbon is some form of pyrolytic carbon.

Composite anode film with loading density from 2.4 to 3.2 mg/cm$^2$ were formed using the standard anode formation procedure described above and tested under the standard conditions outlined above. Anode films incorporating composite samples 1 to 4 were used to fabricate coin cells with lithium counter electrodes, and the testing results were plotted in FIG. 2 and summarized in Table 4.

showed significant drops in capacity when the charging rate was increased from C/20 to C/3. The irreversible capacity losses (IRCLs) from the first cycle are higher than 45%.

Example 2—Preparation of SiO$_x$—C Composites from Sol-Gel Process

SiO$_x$—C composite was formed in sol-gel system with liquid precursors A and B that have alkoxy and alkyl groups, respectively.

Liquid precursor A tetraethoxysilane (e.g. 1 g TEOS) and liquid precursor B diphenyldimethoxysilane (e.g. 4.69 g DPDS) were vigorously mixed in 20 mL ethanol to form a reaction solution. Several drops of concentrated HCl and DI water were added into the reaction solution to form a viscous sol-gel solution. Ethanol in the sol-gel solution was then slowly evaporated when the solution was reacted at 70° C. to form a reaction mixture. Cross-linking occurs in the reaction mixture which was then dried under vacuum at 110° C. overnight to form a solid product. The solid product was transferred to a furnace and heated at a ramping rate of 5° C./min under argon atmosphere and then further reacted at 200° C. for 3 hrs to form a treated solid product. The treated solid product was continually heated at 5° C./min and sintered at 900° C. for 3 hrs in an argon atmosphere before being ground in a mortar and sieved with 45 μm mesh to afford the final SiO$_x$—C composite. In general, the yields of the sintering reaction ranged from 50 weight percent to 75 weight percent.

The resulting SiO$_x$—C composite from TEOS and DPDS was formed into an anode and tested under the standard conditions described above. Various other liquid precursors, including dimethyl dimethoxy silane (DMDS), trimethylmethoxy silane (TMMS), and sodium silicates were also used to synthesize SiO$_x$—C composites by reacting with TEOS. These composites showed a reversible capacity of 400 to 450 mAh/g at a rate of C/3 with almost 93% capacity retention at the 100$^{th}$ cycle. However, the first IRCL is higher than 55% and the capacities at higher rates were lower. Thus, these materials demonstrated good cycling stability, while providing relatively low specific capacity.

Example 3—Preparation of n-Si/SiO$_x$—C Composite Via Polysiloxane or Sol-Gel Precursors This example is directed to the incorporation of submicron silicon powder into the silicon oxide-carbon composites. In order to increase the capacity, n-Si was added as a

TABLE 4

| Sample | Precursor B/A (Anode loading Density, mg/cm$^2$) | C/20 Discharge/Charge (mAh/g) | IRCL, mAh/g (% IRCL discharge) | C/3 discharge, mAh/g (50$^{th}$ cycle %) |
| --- | --- | --- | --- | --- |
| 1 | VMS/PHMS (2.4) | 1620.5/887.3 | 733.2 (45.2) | 674 (87.91) |
| 2 | VMS/HTPDMS (2.6) | 1541.4/791.2 | 750.2 (48.7) | 640.7 (87.08) |
| 3 | TVTMS/PHMS (2.4) | 1491.1/732.2 | 758.9 (50.9) | 598 (96.22) |
| 4 | DVB/PHMS (3.2) | 1386.9/748.4 | 638.5 (46.0) | 592.4 (88.10) |

Figure 2:
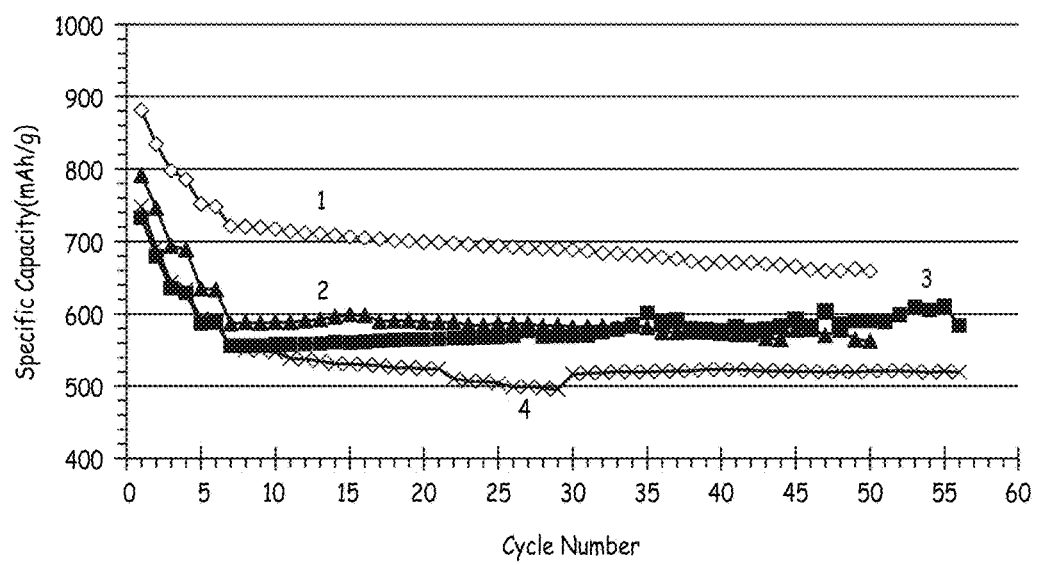
FIG. 2 is a plot of specific capacity as a function of cycle number showing the cycling performance of batteries with various $SiO_x$—C composites from Example 1.

FIG. 2 shows the cyclic performance of batteries with various SiO$_x$—C composites for samples 1-4 that were synthesized with various liquid precursors outlined in Table 4. When the cells are cycled at C/3, the PHMS/VMS system or sample 1 shows reversible charge capacity of 674 mAh/g with 88% capacity retention at the 50$^{th}$ cycle while other systems have the capacities lower than or equal to 598 mAh/g with 96% capacity retention. All these systems solid precursor. n-Si/SiO$_x$—C composites were prepared by the pyrolysis in an inert atmosphere of the mixture of n-Si and polysiloxane or Sol-gel.

For polysiloxane system, n-Si powder was simply added to the liquid precursor mixture in example 1 and dispersed before the liquid precursor was cross-linked with the help of catalysts. For sol-gel system, the liquid precursor in example 2 was cross-linked with the help of catalysts and become a viscous sol-gel solution. n-Si powder (commercial powder with an average particle size from 50-70 nm) was added to the sol-gel solution and dispersed. The rest of the procedures were the same as those in examples 1 and 2.

Figure 3:
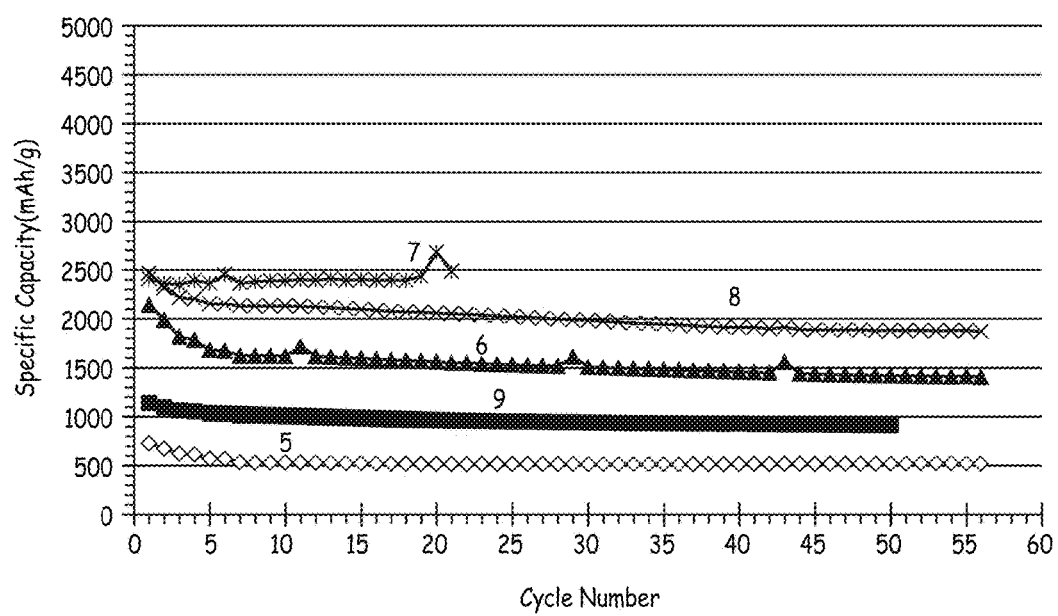
FIG. 3 is a plot of specific capacity as a function of cycle number showing the cycling performance of batteries with various n-Si/$SiO_x$—C composites from Example 3.

The final n-Si/SiO$_x$—C composite was ground in a mortar and sieved with 45 µm mesh. Composite anode was prepared and tested following the standard procedure outlined above. Exemplified precursors and the resulting loading density of the anode film samples 5 to 9 are listed in Table 5, and the results are plotted in FIG. 3 and summarized in Table 6. The solid precursor used for sample 8 besides n-Si, also contains 1% carbon nano tube (CNT).

TABLE 5

| Sample | Liquid Precursors A/B | Solid Precursor | Ratio of Liquid to Solid Precursor | Anode Loading (mg/cm$^2$) |
|---|---|---|---|---|
| 5 | DVB/PHMS | — | — | 2.7 |
| 6 | DVB/PHMS | n-Si | 1:1 | 2.0 |
| 7 | TVTMS/PHMS | n-Si | 1:1 | 1.4 |
| 8 | TVTMS/PHMS | n-Si + 1% CNT | 1:1 | 1.9 |
| 9 | TEOS/DPDS | n-Si | 7:1 | 3.2 |

Figure 4:
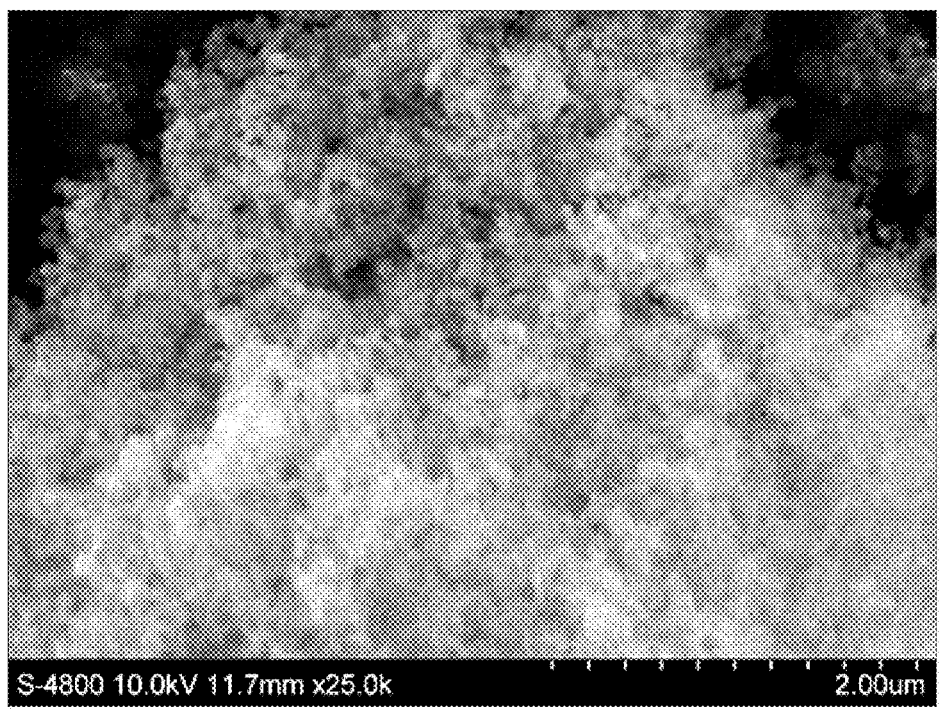
FIG. 4 is a scanning electron micrograph (SEM) photo of n-Si/$SiO_x$—C composite particles.

For polysiloxane system the morphology of n-Si/SiO$_x$—C composites is determined by the ratio of n-Si to liquid precursors. When the ratio of n-Si to liquid precursors is higher than 1, liquid precursors are not enough to play a role as a matrix of the composites but partially glue solid precursor particles. This produces very porous composites after carbonization as shown in FIG. 4. A representative n-Si/TVTMS/PHMS sample has a BET surface area of roughly 70 m$^2$/g. When the ratio of n-Si to liquid precursors is lower than 1 or the anode loading is higher than 2 mg/cm$^2$, the capacity retention and the reversible capacity decrease very rapidly. The electrochemical results of the anodes obtained at the lower anode loading and the lower ratio of liquid precursor to n-Si are summarized in FIG. 3 and Table 6.

TABLE 6

| Sample | C/20 Discharge (mAh/g) | C/20 Charge (mAh/g) | IRCL (mAh/g) | IRCL (%) | C/3 Discharge (mAh/g) | C/3 Discharge 50 cycle (%) |
|---|---|---|---|---|---|---|
| 5 | 1363.9 | 728.2 | 635.7 | 46.6 | 572.6 | 91.02 |
| 6 | 3089.2 | 2140.7 | 948.5 | 30.7 | 1707.3 | 84.04 |
| 7 | 3572.5 | 2409 | 1163.5 | 32.6 | 2442.1 | 87.58 |
| 8 | 4126.1 | 2465.1 | 1661 | 40.3 | 2210.4 | 84.79 |
| 9 | 1728.9 | 1139.9 | 589 | 34.1 | 1032.8 | 88.77 |

These composites show a very high reversible capacity in the range of 1600 to 2400 mAh/g with capacity retention of 88% at the 56$^{th}$ cycle when they are cycled at C/3. The first IRCL is generally higher than 30% depending on the ratio of liquid precursor to n-Si, types of liquid precursors, and anode loading.

For the sol-gel system n-Si is also used as solid precursors. Sample 9 in Table 6 shows the representative electrochemical result from sol-gel system. The reversible capacity is about 1033 mAh/g with excellent c-rate capability and the capacity retention of 89% at the 50$^{th}$ cycle when the n-Si/SiO$_x$—C composite cells are cycled at C/3. The higher anode loading does not significantly reduce the reversible capacity and capacity retention, and IRCL is still higher than 32%. The polysiloxane system is used to further develop n-Si/SiO$_x$—C composites in the next examples.

Example 4—Preparation of Composite Using n-Si-Gr Precursors

In order to improve the rate capability of the composites synthesized from Example 3, n-Si is formed into a composite with conductive carbons such as graphite as solid precursor for incorporation into the composite with the liquid precursors.

Specifically, n-Si was mixed with graphite in toluene and then HEMMed (milled by high energy mechanical milling) at 300 rpm for 1 hr-2 hrs to form n-Si-Gr composites. The ratios of graphite to n-Si are 1:4 and 1:1. The HEMMed n-Si-Gr composites were then mixed with PAN (polyacrylonitrile) and PVC (polyvinylchloride) in NMP (n-methyl-pyrrolidone) and THF (tetrahydrorfuran) respectively and then dried at 110° C. under a vacuum to form dried coated composites. The dried coated composites were then carbonized at 900° C. for 3 hrs under argon atmosphere in a quartz tube. The carbon produced from the carbonation of PAN and PVC was expected to improve the mechanical and electrical properties of the composites by chemically bonding the n-Si and graphite.

The SiO$_x$—C liquid precursor solutions in Examples 1 and 2 can be used to replace PAN and PVC in the above procedure. For example, the HEMMed n-Si-Gr composites were used as solid precursors to synthesize the composites as explained in Example 3, where PHMS/TVTMS and TEOS/DPDS are used as liquid precursors respectively. The final product was an n-Si-Gr/SiO$_x$—C composite material. The final composites are ground in a mortar and sieved with 45 µm mesh.

The composite anode was prepared and tested using the standard procedure outlined above. The precursor samples used and the resulting loading density of the anode film samples 10 to 15 are listed in Table 7 and the electrochemical results are summarized in Table 8.

TABLE 7

| Sample | Liquid Precursors A/B | Solid Precursor (Ratio of Si:Gr) | Ratio of Liquid to Solid Precursor | Anode Loading (mg/cm$^2$) |
|---|---|---|---|---|
| 10 | — | n-Si-Gr (1:1) | — | 3.0 |
| 11 | — | n-Si-Gr (4:1) | — | 2.0 |
| 12 | PAN | n-Si-Gr (4:1) | 0.3:1 | 2.0 |
| 13 | PVC | n-Si-Gr (4:1) | 0.3:1 | 1.8 |
| 14 | Polysiloxane | n-Si-Gr (4:1) | 0.45:1 | 2.1 |
| 15 | TEOS/DPDS | n-Si-Gr (1:1) | 2.8:1 | 2.3 |
| 16 | TEOS/DPDS | n-Si-Gr (1:1) | 1.1:1 | 3.5 |

TABLE 8

| Sample | C/20 Discharge (mAh/g) | C/20 Charge (mAh/g) | IRCL (mAh/g) | IRCL (%) | C/3 Discharge (mAh/g) | C/3 50 cycle efficiency (%) |
|---|---|---|---|---|---|---|
| 10 | 2208.8 | 1710.3 | 498.5 | 22.6 | 1753.1 | 77.66 |
| 11 | 3421.4 | 2464.8 | 956.6 | 28.0 | 574.8 | 17.38 |

TABLE 8-continued

| Sample | C/20 Discharge (mAh/g) | C/20 Charge (mAh/g) | IRCL (mAh/g) | IRCL (%) | C/3 Discharge (mAh/g) | C/3 50 cycle efficiency (%) |
|---|---|---|---|---|---|---|
| 12 | 2520.3 | 1979.5 | 540.8 | 21.5 | 1828.8 | 52.65 |
| 13 | 2955.4 | 2280.8 | 674.6 | 22.8 | 2167.8 | 67.29 |
| 14 | 2718.3 | 2066.8 | 651.5 | 24.0 | 1444 | 27.37 |
| 15 | 1653.5 | 974 | 679.5 | 41.1 | 891.9 | 95.12 |
| 16 | 1878.9 | 1274.8 | 604.1 | 32.2 | 1205.8 | 88.61 |

The cycling performance of sample 10 was very stable up to 13 cycles with about 23% IRCL and excellent c rate capability. However, the capacity rapidly fades near at the 14$^{th}$ cycle and then is stabilized. The composite of sample 10 has a C/20 charge capacity of 2208 mAh/g with the capacity retention of about 78% at the 50$^{th}$ cycle when it is cycled at C/3. The first cycle discharge capacity of sample 11 is 3421 mAh/g with 28% IRCL. The composite of sample 11 rapidly fades even after the first cycle.

The use of PAN, PVC, and polysiloxane as a source to bind n-Si and graphite is expected to improve the electrical and mechanical properties of the HEMMed graphite/n-Si composite after carbonization. As shown in Table 8, the addition of later carbonized liquid precursors significantly improved the reversible capacity and the cyclability of the n-Si-Gr composite materials. Sample 13 with the use of PVC has reduced the IRCL from 28% to about 23% and increased the reversible capacity 575 mAh/g to 2168 mAh/g at C/3. The capacity retention of sample 13 is 62% at the 106$^{th}$ cycle while corresponding composite sample 11 has rapid capacity fade even at the 2$^{th}$ cycle.

For the sol-gel system in samples 15 and 16, the reversible capacity is in the range of 900 to 1200 mAh/g with excellent C/3 rate capability and the capacity retention of about 89% to about 95% at the 50$^{th}$ cycle at C/3. This result is better than that from corresponding composite sample 10 in terms of capacity retention. The IRCL however increased from about 23% to about 32% to 41%. The capacity retention of sample 15 in particular is higher than 95% at the 56$^{th}$ cycle. The reversible capacity and capacity retention are good even at the higher anode loading of sample 16. The cycling performance of sample 16 appears to be similar to sample 9 from Example 3, which indicates that graphite does not significantly affect the cycling performance in sol-gel systems.

Example 5—Preparation of Nano-Porous Si Rich SiO$_x$/CNF Composite

Nano-porous Si rich SiO$_x$/CNF composite was prepared via the magnesium reduction of PDES (polydiethoxysiloxane).

Ammonium Fluoride/Ammonium hydroxide catalyst stock solution was prepared by weighing 1.852 g NH$_4$F and adding it to 100 mL of DI water under vigorous mixing followed by the addition of 20.50 g (22.78 mL) ammonium hydroxide solution (29%). The resulting ammonium fluoride/ammonium hydroxide catalyst stock solution was then stored in a bottle.

11.58 g PDES was dissolved in 22 mL ethanol in a Teflon® beaker. Carbon nano fiber (weight ratio of CNF to Si=0.15) was added to the solution. 5.7 g magnesium powder was then dispersed in the solution under vigorous agitation. The molar ratio of Si to Mg in the magnesium mixture is in the range of 0.3 to 1.2.

The ammonium fluoride/ammonium hydroxide catalyst stock solution (0.74 mL) was diluted with 14 mL DI water and 22 mL ethanol and then mixed with the above magnesium mixture. Gel formation occurred in 10 min. The Gel like-solid product was dried under fume hood and then under a vacuum at room temperature for 5 hrs and then at 80° C. overnight. Magnesium reduction was conducted at 650° C. under argon atmosphere for 3 hrs with a heating rate of 5° C./min. The final product was etched out with 10% HCl and then washed with DI water several times until its pH reaches 7. It is dried under a vacuum at 110° C. overnight and then ground and sieved with 45 µm mesh. The resulting material was very porous, and a representative product had a BET surface area of about 104 m$^2$/g. The obtained Si rich SiO$_x$/CNF was used as an active material to make a composite anode film. The laminating process follows the procedure described in other examples. The anode film was then used to fabricate batteries with lithium metal counter electrode and tested under same cycling rates and voltage window as in other examples.

Figure 5:
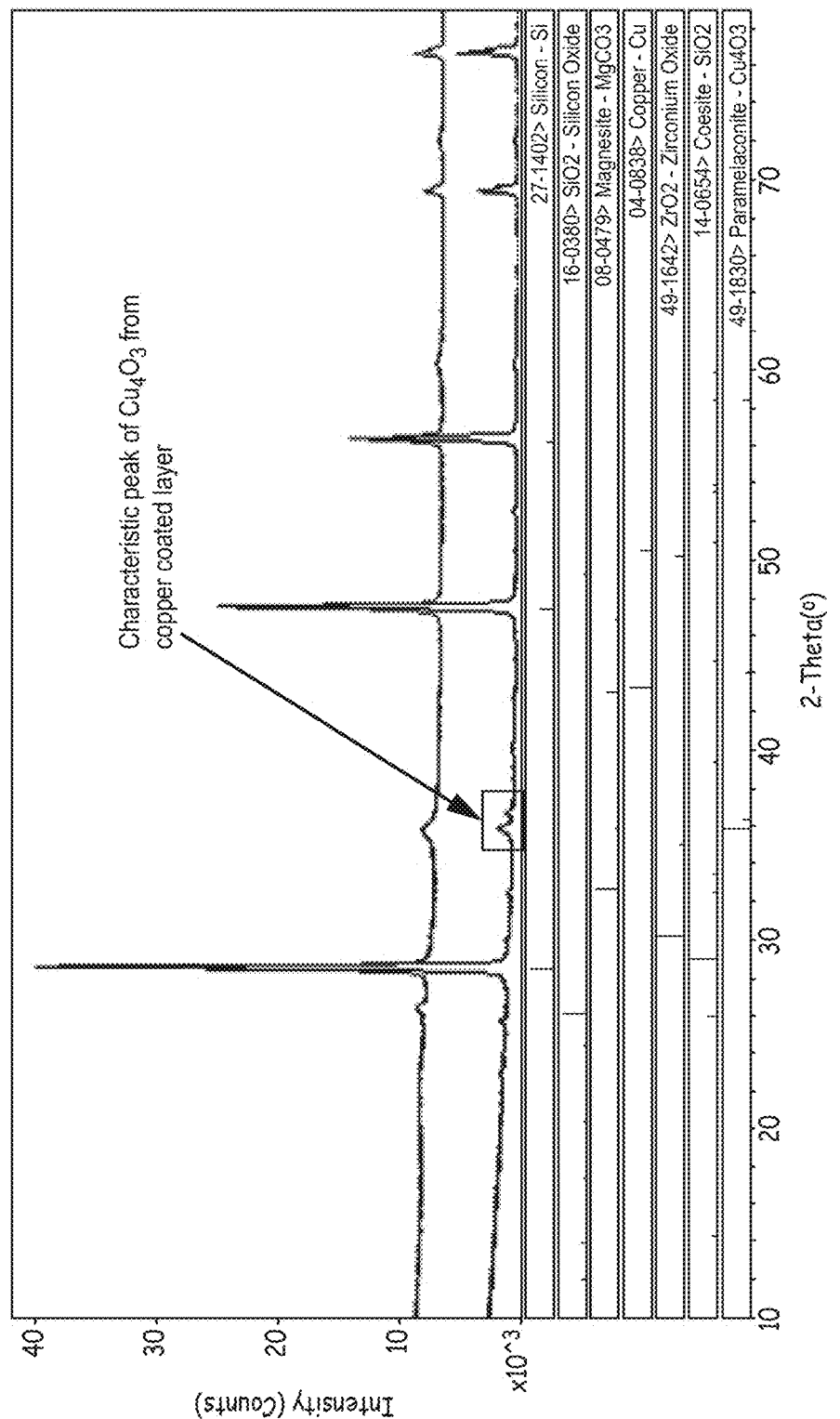
FIG. 5 is an x-ray diffractogram of copper coated samples of Example 5.
Figure 6B:
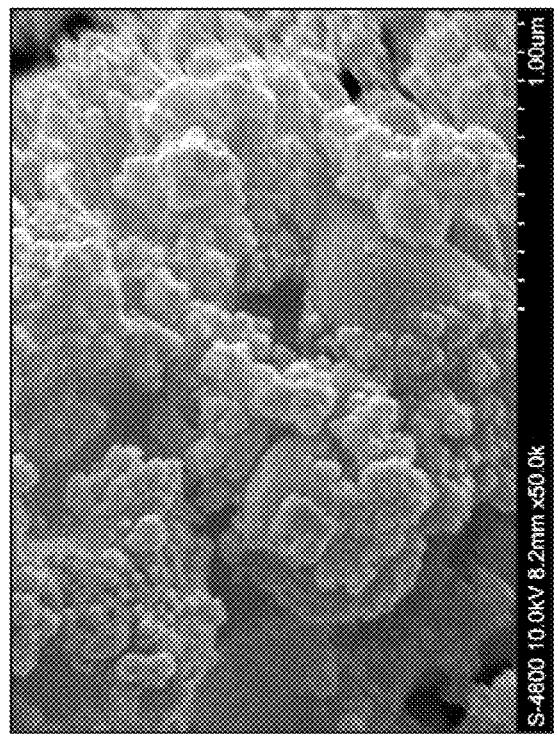
FIG. 6(b) is an SEM photo of a sample of Example 5 with a copper coating in comparison with the photo of FIG. 6(a).

In order to improve the mechanical and electrical properties of the nano porous Si rich Si$_x$O/CNF composite powder, carbon or copper was coated on its surface. The carbon coating process with PAN was the same as the one described in example 4. For copper coating, 5 g CuSO$_4$5H$_2$O, 43.8 g EDTA, and 7 g NaOH were dissolved in 600 mL of de-ionized water to form a copper salt solution. 10 mL of formaldehyde was added as a reducing agent to the copper salt solution and then the volume of the final solution was adjusted to 1 L by adding de-ionized water. 5.6 g of the above Si rich SiO$_x$/CNF powder was added to the copper salt solution under vigorous agitation and copper was coated on its surface at room temperature for 2 hrs. The weight ratio of Si to Cu was controlled to be 10. This process should be carried out for 20 min immediately after the above Mg reduced precursor is etched out with 10% HCl and neutralized with 10% NaOH solution. Cu deposited powder was recovered by filtration and then washed with deionized (DI) water several times. The final samples were dried under a vacuum at 110° C. overnight. X-ray measurements were performed on the copper coated samples and shown in FIG. 5. Characteristic peak of Cu$_4$O$_3$ was observed in the x-ray diffractograms, indicating the oxidation of the copper coated layer, and copper oxidation may be due to the exposure of the thin copper film in air or to the drying process at high temperature. SEM of the sample particles before and after the copper coating were performed and shown in FIGS. 6(a) and 6(b) respectively. The surface of copper coated sample in FIG. 6(b) is shown to be smoother and less porous compared to the surface of uncoated sample show in FIG. 6(a).

Figure 6A:
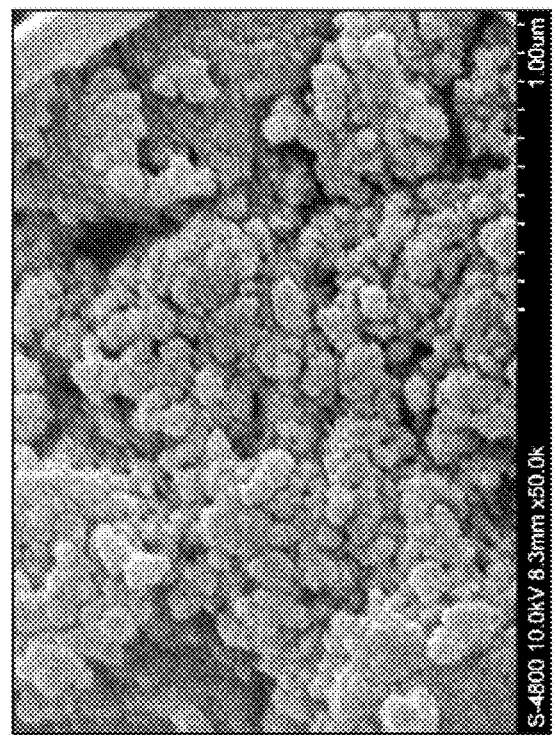
FIG. 6(a) is an SEM photo of a sample of Example 5 without copper coating.
Figure 7B:
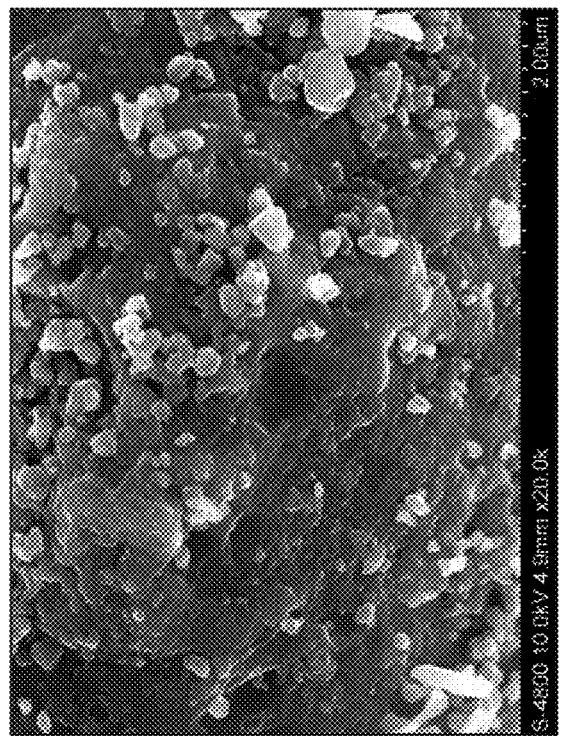
FIG. 7(b) is an SEM photo of a sample subjected to high energy mechanical milling of Example 5 in comparison with the photo of FIG. 7(a).
Figure 7A:
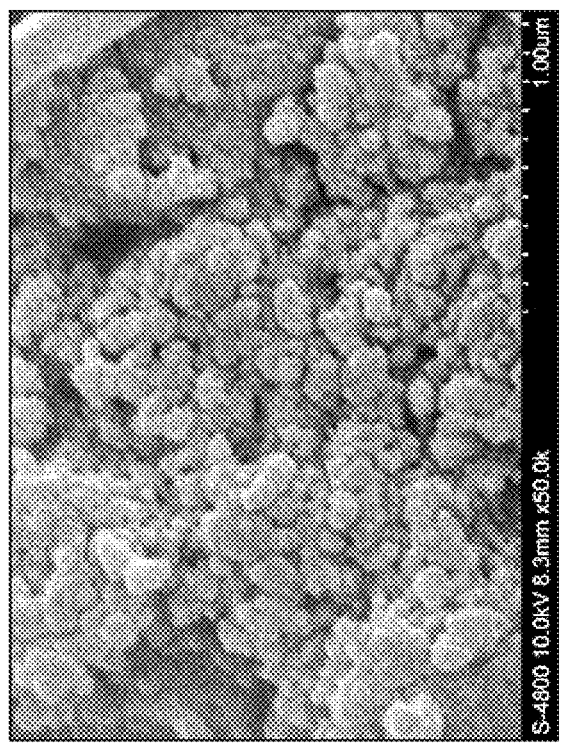
FIG. 7(a) is an SEM photo of a sample of Example 5 without copper coating.

The morphology of the uncoated sample was additionally compared to a sample formed with high energy mechanical milling (HEMM). Specifically, n-Si was mixed with nickel powder and then HEMMed at 300 rpm for 15 hrs to form a composite. The ratio of n-Si to Ni is 70:30. SEM of the uncoated sample and the HEMM formed composite were performed and shown in FIGS. 7(a) and 7(b) respectively. The surface of the HEMM formed composite in FIG. 7(b) is shown to be very compact while the magnesium reduction of PDES formed samples with porous structure of pure silicon as shown in FIGS. 6(a) and 7(a).

The anode lamination process was the same as those in other examples. The composite anode was prepared and tested using the standard procedure outlined above. The precursor samples and the resulting loading density of the anode film samples 17 to 23 are listed in Table 9 and the electrochemical results are summarized in Table 10.

TABLE 9

| Sample | Precursors (weight ratio of 1st precursor to 2nd precursor) | Anode Loading (mg/cm$^2$) |
|---|---|---|
| 17 | PDES/15% CNF:Mg, (2.8:1) | 1.1 |
| 18 | PAN:Sample 17, (1:3.3) | 2.1 |
| 19 | Copper coated sample 17 | 1.4 |
| 20 | Copper coated sample 17 | 2.4 |
| 21 | Copper coated sample 17 | 2.5 |
| 22 | Copper coated sample 17 | 3.4 |
| 23 | Copper coated sample 17 | 3.5 |

TABLE 10

| Sample | C/20 Discharge (mAh/g) | C/20 Charge (mAh/g) | IRCL (mAh/g) | IRCL (%) | C/3 Discharge (mAh/g) | C/3 Charge (mAh/g) | C/3 50 cycle efficiency (%) |
|---|---|---|---|---|---|---|---|
| 17 | 2511.2 | 345.8 | 2165.4 | 86.2 | 22.5 | — | 47.29 |
| 18 | 2069.9 | 1309.5 | 760.4 | 36.7 | 1254.5 | — | 30.45 |
| 19 | 3391.3 | 2418 | 973.3 | 28.7 | 1918 | 1796.6 | 90.49 |
| 20 | 3330.4 | 2485.7 | 844.7 | 25.4 | 1577.2 | 1409.5 | 91.53 |
| 21 | 3319 | 2157.4 | 1161.6 | 35.0 | 1337.9 | 1128.5 | 86.46 |
| 22 | 3273.9 | 1915.7 | 1358.2 | 41.5 | 866.2 | 706.2 | 63.55 |
| 23 | 3144.3 | 1953.2 | 1191.1 | 37.9 | 953.3 | 773.2 | 64.91 |

Figure 8:
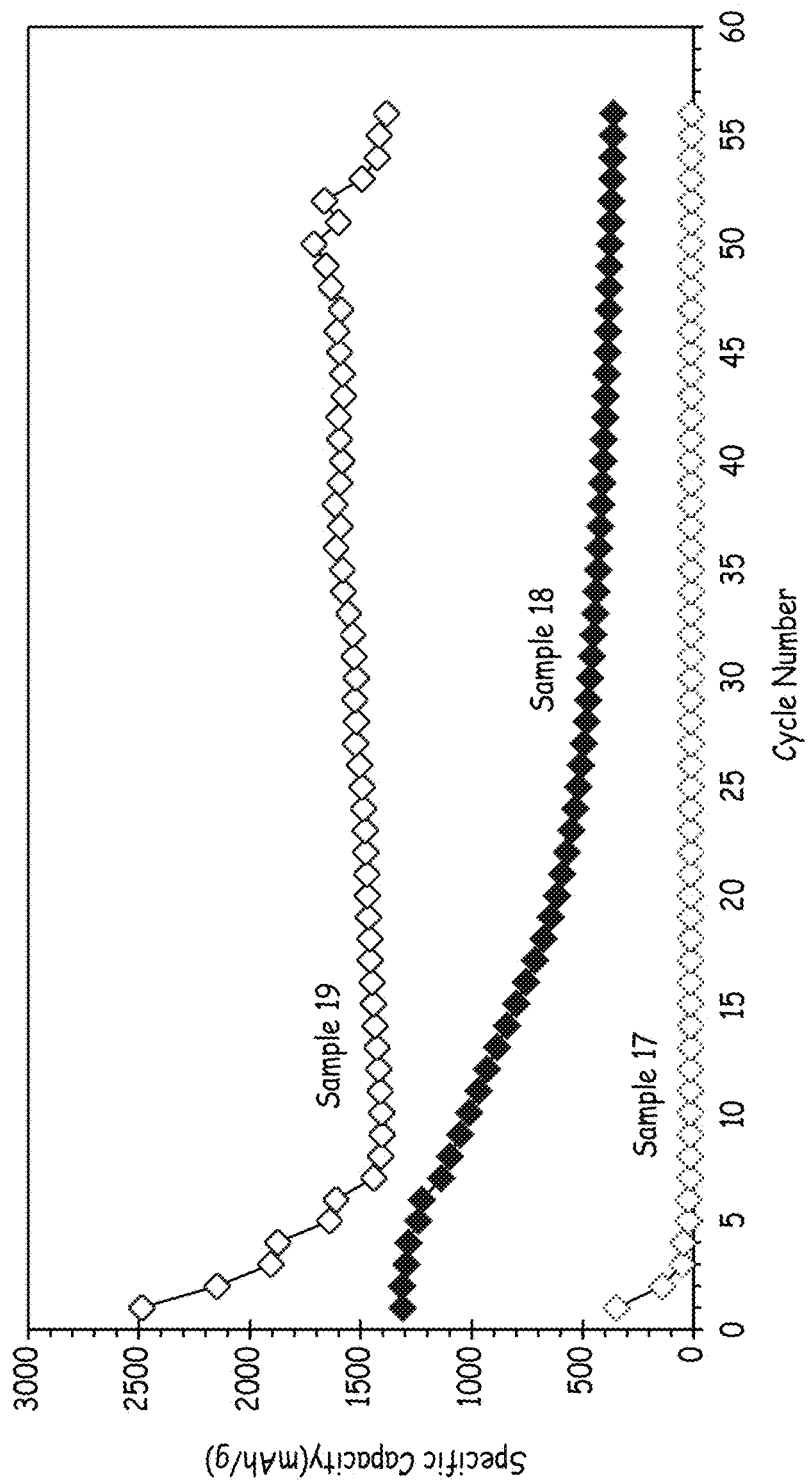
FIG. 8 is a plot of specific capacity as a function of cycle number showing the cycling performance of batteries with various nano-porous Si rich $SiO_x$/CNF composites from Example 5.
Figure 9:
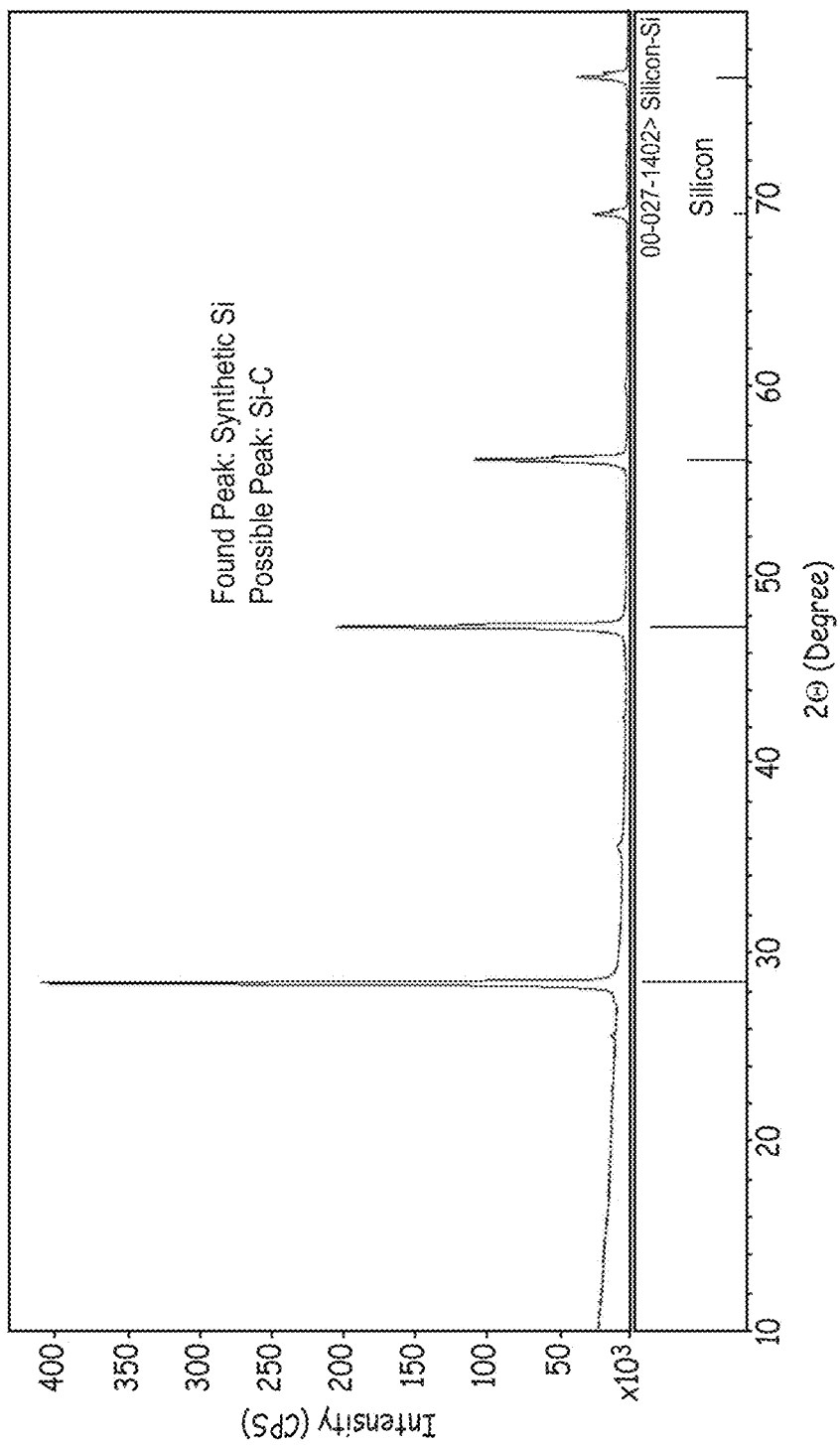
FIG. 9 is an X-ray diffractogram, of magnesium reduced sample without copper coating of Example 5.

In FIG. 8 and Table 10, nano-porous Si rich SiO$_x$/CNF composite sample 17 shows the first discharge capacity of 2511 mAh/g with IRCL of 86%. For this sample, the capacity rapidly fades from the first cycle. When carbon was coated on the composite by the carbonization with PAN as in sample 18, it increases the reversible capacity from 100 mAh/g to 1300 mAh/g but the cyclic performance starts to rapidly fade near the 8$^{th}$ cycle. Copper coating on the Si rich SiO$_x$/CNF composite significantly increased the first discharge capacity up to the range of 3144 to 3330 mAh/g with reduced IRCL. Samples 19-23 in tables 9 and 10 were directed to batteries formed from copper coated active composite material anodes with different loading densities. When the batteries were cycled at C/3, the capacity retention of the samples 19-23 batteries were generally higher than 95% at the 56$^{th}$ cycle and insignificantly affected by higher anode loading. However, the capacity loss (%) due to poor rate capability (C/20 to C/3) increased from 25.7 to 60.4% as the anode loading increases from 1.1 to 3.5 mg/cm$^2$. This indicates that the cyclability of the batteries were improved by the mechanical properties increased by copper coating layer but the C/3 rate capability was still low. The XRD analysis of sample 17 in FIG. 9 confirms that almost pure Si can be obtained from the magnesium reduction.

Example 6—Preparation of Nano Structured Si Rich SiO$_x$ Composite

Nano structured Si rich SiO$_x$ composite were prepared from the magnesium reduction of sodium silicate in this example.

Water solubility of magnesium hydroxide is 12 mg/L. Due to its low solubility, magnesium hydroxide formation can protect Mg particles from further oxidation by water, which means that Mg metal particle is stable in an alkaline solution because Mg forms magnesium hydroxide at high pH that protects the Mg metal from further reaction.

The pH of 22.64 g sodium silicate solution was adjusted up to 12 by adding 1M HCl solution. 2.5 g Mg powder was added to the sodium silicate solution in this alkaline regime and dispersed very uniformly. The molar ratio of Si to Mg was in the range of 0.2 to 1.5 depending on the desired content of elemental silicon. Since 2 moles of Mg react with 1 mole of SiO$_2$ to remove oxygen from SiO$_2$ completely, the ratio of Si to Mg controls the pure silicon content in the Si rich SiO$_x$ composite. Immediately after acetone was added to the mixed solution, sodium silicate starts to agglomerate with magnesium particles. After the bulky solid product was obtained, it was washed with DI water until its pH reached 7. The product was then dried under a vacuum at room temperature for 5 hrs and then at 110° C. overnight. In order to improve the magnesium reduction efficiency, the solid mixture can be ground by HEMM (high energy mechanical milling) or in a mortar, prior to Mg reduction. This process reduces the size of magnesium particles and maximizes the contact area between Mg and SiO$_2$ particles. Magnesium reduction was conducted at 650° C. under argon atmosphere for 3 hrs. The reduced product was etched with 10% HCl and washed with DI water until its pH reached 7. The product was then dried under a vacuum at 110° C. overnight and was ground in a mortar and sieved with 45 μm mesh. The product material was very porous, and a representative product sample has a BET surface area of about 104 m$^2$/g. The composite anode was prepared and tested using the standard procedure outlined above. The precursor samples and the resulting loading density of the anode film samples 24 and 25 are listed in Table 11 and the electrochemical results are summarized in Table 12.

TABLE 11

| Sample | Precursors, molar ratio of Si to Mg | Anode Loading (mg/cm$^2$) |
|---|---|---|
| 24 | Sodium silicate/Mg, 1:2 | 2.5 |
| 25 | Sodium silicate/Mg, 1:1.1 | 2.5 |

TABLE 12

| Sample | C/20 Discharge (mAh/g) | C/20 charge (mAh/g) | IRCL (mAh/g) | First IRCL (%) | C/3 discharge (mAh/g) | C/3 50 cycle efficiency (%) |
|---|---|---|---|---|---|---|
| 24 | 3249.1 | 1536.9 | 1712.2 | 52.7 | 211.8 | 33.05 |
| 25 | 1037.4 | 723.3 | 314.1 | 30.3 | 557.9 | 46.84 |

Table 12 shows the representative results obtained under various experimental conditions. The first discharge capacity of Si rich $SiO_x$ composites is in the range of 3200 to 3500 mAh/g when the molar ratio of Si to Mg is 0.5. The high capacities indicate that the composites have a very high elemental Si content, which may be combined with a small amount of $SiO_2$. XRD analysis also confirms this conclusion even though the XRD spectra are not shown in this document. However, the Si rich $SiO_x$ composite anodes start to rapidly fail from the second cycle. The capacity rapidly fades and reaches to 100 mAh/g in 3 cycles. This problem may be mainly caused by the morphology of porous Si rich $SiO_x$ composite in which n-Si can easily fall off from the composite or electric conduction is interrupted by its morphology.

When the molar ratio of Si to Mg is 0.99, the first reversible discharge capacity is 1050 mAh/g. XRD spectrum shows a large peak of $SiO_2$ phase. This confirms that pure Si content decreases as the molar ratio of Si to Mg increases.

Example 7—Electrochemical Characterization of Batteries with High Capacity Cathode Material Anodes corresponding with samples 1, 6, and 16 were electrochemically characterized with HCMR® high capacity cathode material in this example.

Cathodes for these batteries had 94% active material, 2.5% binder (MW: 1000 k, PVDF, 2.5% conductive agent (Super-P®), and 1% conductive carbon nanotube. The cathode-anode balance (=first discharge capacity of silicon composite anode/first charge capacity of cathode) was controlled in the range of 1 to 1.7 as shown in Table 13 below using anode samples 1, 6, 16 for batteries 26, 27, and 28 respectively.

TABLE 13

| Sample | Anode | Anode Loading (mg/cm²) | Cathode | Cathode-Anode Balance |
|---|---|---|---|---|
| 26 | Sample 1 | 3.9 | HCMR | 1.6 |
| 27 | Sample 6 | 2.2-2.3 (3 cells) | HCMR | 1.2-1.4 (3 cells) |
| 28 | Sample 16 | 2.2-2.6 (3 cells) | HCMR | 1.3-1.5 (3 cells) |

Since the first IRCL of composite anodes is about 1.3 to 3 times higher than that of the cathode, lithium metal additives such as SLMP® (FMC Co.) were loaded on the anode in order to compensate for 100% anode IRCL. The anode films from examples 1, 6, and 16 were used to fabricate batteries by combining with HCMR® cathodes. Fresh cells were charged up to 4.6V at a rate of C/20 and continually charged at 4.6V constant voltage to activate $Li_2MnO_3$ phase until the current reached C/50 and then discharged up to 1V at a rate of C/20. After the activation process, the cells were charged galvanostatically up to 4.5V at selected rates and then potentiostatically at 4.5V until the current reaches C/50. They are galvanostatically discharged up to 1V. After the initial activation cycle, the batteries are then subjected to 2 cycles at a rate of C/10 charge/discharge, 2 cycles at a rate of C/5 charge/discharge and the remaining cycling at a rate of C/3.

The electrochemical performance of HCMR® cathode is considered to be more stable than the composite anodes described herein. This means that the observed cycling performance can generally be attributed to the performance of the anode. Anode composite samples 1, 6, and 16 were selected based on the performance summarized in the previous Examples to fabricate batteries 26, 27, and 28 and their representative cycling data are listed in Table 14 based on the weight of the cathode active material.

TABLE 14

| Sample | C/20 discharge (mAh/g) | C/20 charge (mAh/g) | IRCL (mAh/g) | C/3 discharge (mAh/g) | C/3 50 cycle efficiency (%) | Capacity retention (%) at C/3 |
|---|---|---|---|---|---|---|
| 26 | 275.3 | 315 | 39.7 | 217 | 93.7 | 87% at 205$^{th}$ cycle |
| 27 | 283.9 | 317.62 | 33.72 | 219.4 | 89.8 | 80% at 70$^{th}$ cycle |
| 28 | 264.5 | 296 | 31.5 | 203.9 | 94.3 | 80% at 144$^{th}$ cycle |

Figure 10:
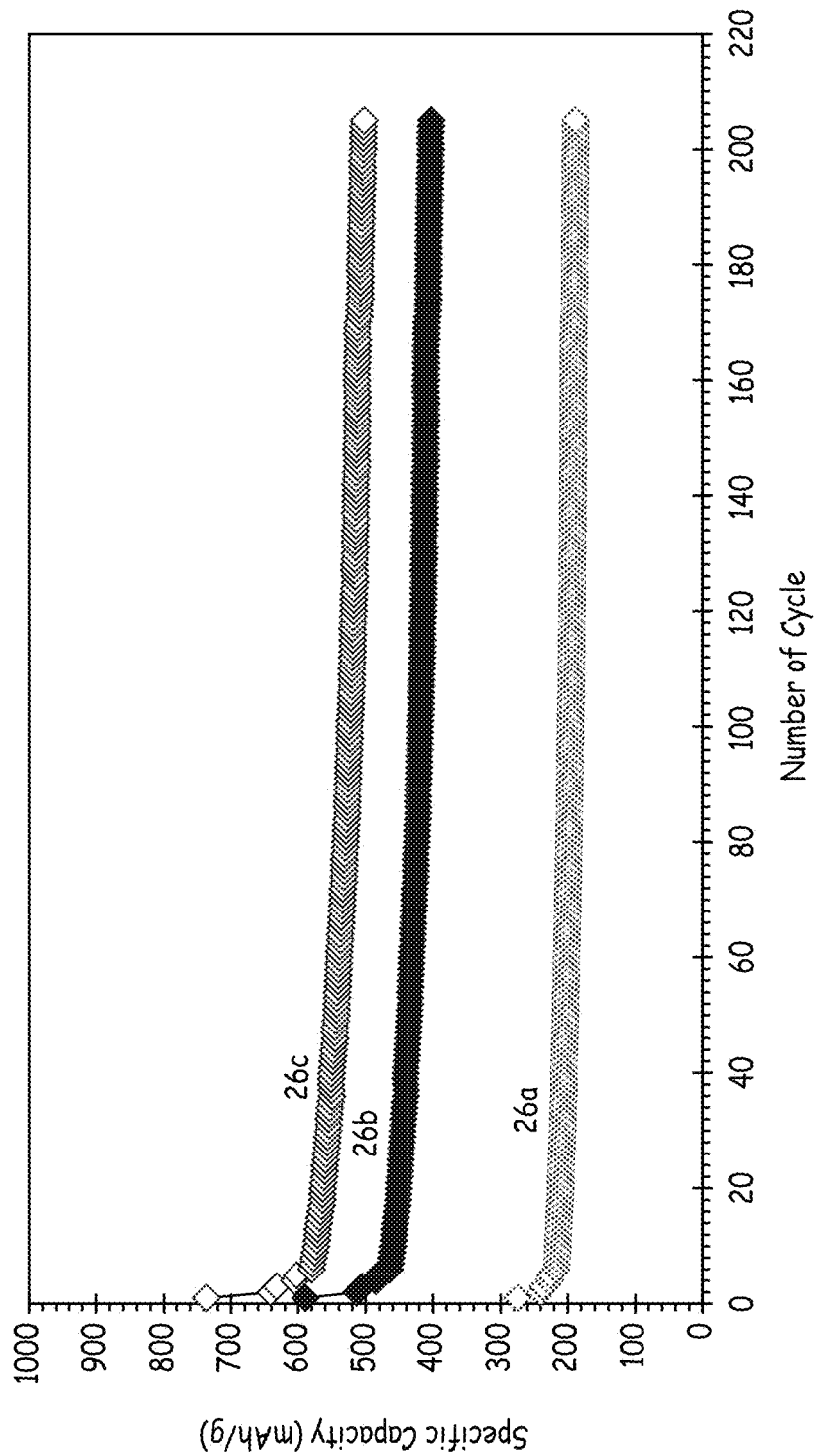
FIG. 10 is a plot of specific capacity as a function of cycle number showing cycling performance of battery sample 26 from Example 7 with 26a showing the cathode capacity of the battery, 26b showing the anode capacity computed by including SLMP weight and 26c showing the anode capacity computed by excluding SLMP weight.

The cycling performance of battery sample 26 was further evaluated in FIG. 10, with 26a showing the cathode capacity of the battery, 26b showing the anode capacity computed by including SLMP® weight and 26c showing the anode capacity computed by excluding SLMP® weight. Battery sample 26 was constructed with electrolyte that contains 10% FEC.

Battery sample 26 that is constructed from the composite anode sample 1, which is synthesized by carbonizing the PHMS/VMS mixture showed the most stable cyclic performance in Table 14. The battery sample 26 has 87% capacity efficiency at the 205$^{th}$ cycle when it was cycled at C/3. This result is expected from its stable cycling performance with lithium metal counter electrode in Example 1 where it has 700 mAh/g of reversible capacity, which is highest among $SiO_x$—C composite in Table 4.

Even though samples 7 and 8 from Example 3 have much higher reversible capacity than sample 1, initial attempts to fabricate batteries with HCMR® counter electrode resulted mostly with batteries exhibiting rapid capacity fade in several cycles. However, a few of the batteries cells showed very good electrochemical performance. The results suggest that the external pressure loading during fabrication may have destroyed the porous structure of the composite anodes and interrupted the electrical connection among n-Si particles.

When sample 6 in Example 3 was used to construct battery sample 27, the battery showed capacity retention of 80% at the 70$^{th}$ cycle. Sample 16 in Example 4 was used to construct battery sample 28 which appear to have better cycling performance than battery sample 27 although sample 16 has a lower reversible capacity than sample 6 with lithium metal counter electrode. Battery sample 28 showed 80% capacity retention at the 144$^{th}$ cycle. These results indicate that high energy batteries having good cyclic performance can be fabricated with the high capacity anode composites described herein.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A silicon-silicon oxide-carbon composite composition comprising a matrix, nanoscale elemental silicon embedded within the matrix, and particulate carbon, the matrix comprising a silicon oxide-carbon composite and the particulate carbon comprising particulate graphite, particulate nanoscale carbon or mixtures thereof, wherein the composite comprises from about 40 weight percent to about 85 weight percent nanoscale elemental silicon, wherein the nanoscale elemental silicon is crystalline elemental silicon having an average particle diameter of no more than about 250 nm.

2. The silicon-silicon oxide-carbon composite composition of claim 1 wherein the nanoscale elemental silicon comprises crystalline nanoparticles.

3. The silicon-silicon oxide-carbon composite composition of claim 1 having a BET surface area of at least about 30 $m^2/g$.

4. The silicon-silicon oxide-carbon composite composition of claim 1 having from about 45 weight percent to about 80 weight percent nanoscale elemental silicon.

5. The silicon-silicon oxide-carbon composite composition of claim 1 wherein the silicon oxide-carbon matrix is formed from the pyrolysis of sol-gel precursor.

6. The silicon-silicon oxide-carbon composite composition of claim 1 wherein the silicon oxide-carbon matrix is formed from the pyrolysis of a precursor material comprising a crosslinked polysiloxane polymer.

7. The silicon-silicon oxide-carbon composite composition of claim 1 wherein the composite composition has a specific capacity of at least about 850 mAh/g at a discharge rate of C/3 when discharged at room temperature from 1.5V to 0.005V against lithium metal.

8. The silicon-silicon oxide-carbon composite composition of claim 1 further comprising an inert metal coating.

9. The silicon-silicon oxide-carbon composite composition of claim 8 having a specific capacity of at least about 750 mAh/g at a discharge rate of C/3 at the 50th cycle when discharged at room temperature from 1.5V to 0.005V against lithium metal.

10. The silicon-silicon oxide-carbon composite composition of claim 1 having a discharge specific capacity of at least about 1700 mAh/g at a rate of C/20 and a 50th cycle discharge specific capacity of at least about 90% of the 5th cycle discharge capacity when discharged at a rate of C/3 from 1.5V to 0.005V against lithium.

11. The silicon-silicon oxide-carbon composite material of claim 10 wherein the composite comprises from about 45 weight percent to about 85 weight percent elemental silicon.

12. The silicon-silicon oxide-carbon composite material of claim 10 wherein the nanoscale silicon comprises porous nanostructured elemental silicon.

13. The silicon-silicon oxide-carbon composite material of claim 10 wherein the nanoscale silicon comprises silicon nanoparticles.

14. The silicon-silicon oxide-carbon composite material of claim 10 wherein the silicon oxide-carbon matrix material is synthesized from the pyrolysis of highly crosslinked polysiloxane polymer.

15. The silicon-silicon oxide-carbon composite material of claim 10 having a BET surface area of at least about 20 $m^2/g$.

16. The silicon-silicon oxide-carbon composite composition of claim 1 wherein the carbon comprises particulate graphite.

17. The silicon-silicon oxide-carbon composite composition of claim 1 wherein the carbon comprises particulate nanoscale carbon selected from the group consisting of carbon nanofibers, carbon black, carbon nanotubes, and mixtures thereof.

18. A silicon-silicon oxide-carbon composite composition comprising a matrix, nanoscale elemental silicon embedded within the matrix, and an inert metal coating, the matrix comprising a silicon oxide-carbon composite, wherein the composite comprises from about 40 weight percent to about 85 weight percent nanoscale elemental silicon and from about 0.1 to about 20 weight percent metal coating, and wherein the nanoscale elemental silicon is crystalline elemental silicon having an average particle diameter of no more than about 250 nm, nanostructured elemental silicon having a BET surface area from about 20 $m^2/g$ to about 150 $m^2/g$ or a combination thereof.

19. The silicon-silicon oxide-carbon composite composition of claim 18 wherein the inert metal coating comprises copper.

20. The silicon-silicon oxide-carbon composite of claim 18 comprising from about 1 to about 12 weight percent inert metal.

* * * * *